United States Patent
Barad et al.

(10) Patent No.: US 11,301,596 B2
(45) Date of Patent: Apr. 12, 2022

(54) TOOL AND METHOD FOR USING THE SAME

(71) Applicant: AlphaMorph, LLC, Colorado Springs, CO (US)

(72) Inventors: Matthew Barad, Broomfield, CO (US); Jackson Chen, Colorado Springs, CO (US)

(73) Assignee: AlphaMorph, LLC, Colorado Springs, CO (US)

( * ) Notice: Subject to any disclaimer, the term of this patent is extended or adjusted under 35 U.S.C. 154(b) by 490 days.

(21) Appl. No.: 16/143,998

(22) Filed: Sep. 27, 2018

(65) Prior Publication Data

US 2019/0095546 A1 Mar. 28, 2019

Related U.S. Application Data

(60) Provisional application No. 62/563,772, filed on Sep. 27, 2017.

(51) Int. Cl.
*G06F 30/00* (2020.01)
*G06N 3/12* (2006.01)
(Continued)

(52) U.S. Cl.
CPC ........... *G06F 30/00* (2020.01); *G06N 3/126* (2013.01); *G06F 2111/06* (2020.01); *G06F 2111/20* (2020.01)

(58) Field of Classification Search
CPC .. G06F 30/00; G06F 2111/06; G06F 2111/20; G06F 30/20; G06F 2111/08; G06N 3/126; G06N 5/022
See application file for complete search history.

(56) References Cited

U.S. PATENT DOCUMENTS

| 4,935,877 A | 6/1990 | Koza |
| 5,136,686 A | 8/1992 | Koza |

(Continued)

FOREIGN PATENT DOCUMENTS

CN 104809889 A 7/2015

OTHER PUBLICATIONS

Voudouris et al. "Guided Local Search" in Handbook of Metaheuristics, Glover et al. [Eds], Chapter 7; Kluwer Academic Publishers [retrieved on Apr. 18, 2021]. (Year: 2003).*

(Continued)

*Primary Examiner* — Rehana Perveen
*Assistant Examiner* — Alfred H B Wechselberger
(74) *Attorney, Agent, or Firm* — Procopio, Cory, Hargreaves & Savitch LLP

(57) ABSTRACT

An engineering design tool and methods for using the same are disclosed. A method may include receiving at least one parent design and generating a plurality of first-generation design copies that each include a characteristic that has mutated from the parent design. New generations of design copies are successively produced from the additional design copies based on fitness testing the new generations of design copies. Characteristics from intergenerational design copies that are not within the same generation are utilized to perform intergenerational crossover, and a likelihood of a mutation of a design copy is increased in response to a threshold number of generations without an improvement in a fitness score of a design copy. New generations continue to be successively produced until a likelihood that any design copy with a higher fitness score will be produced is below a statistical threshold.

19 Claims, 27 Drawing Sheets

*may take several generations of a characteristic persisting before chance decreases

(51) Int. Cl.
*G06F 111/06* (2020.01)
*G06F 111/20* (2020.01)

(56) References Cited

U.S. PATENT DOCUMENTS

| | | | |
|---|---|---|---|
| 5,255,345 A | 10/1993 | Shaefer | |
| 5,867,397 A | 2/1999 | Koza et al. | |
| 7,987,143 B2 | 7/2011 | Gael | |
| 7,996,344 B1 | 8/2011 | Gael | |
| 9,345,881 B2 | 5/2016 | Lineaweaver | |
| 9,680,851 B2 | 6/2017 | Boutnaru et al. | |
| 9,785,886 B1 | 10/2017 | Andoni et al. | |
| 2019/0080240 A1* | 3/2019 | Andoni | G06N 3/086 |

OTHER PUBLICATIONS

Liu et al. "An Adaptive Annealing Genetic Algorithm for Job-shop Scheduling" 2008 3rd IEEE Conference on Industrial Electronics and Applications; doi: 10.1109/ICIEA.2008.4582472 [retrieved on Apr. 19, 2021] (Year: 2008).*

Cui et al. "An Adaptive Mutation Method for GA Based on Relative Importance" 2010 3rd International Conference on Advanced Computer Theory and Engineering (ICACTE); doi: 10.1109/ICACTE.2010.5579270 [retrieved on Apr. 19, 2021] (Year: 2010).*

Herrera et al. "Adaptation of Genetic Algorithm Parameters Based on Fuzzy Logic Controllers" ResearchGate.com [retrieved on Apr. 16, 2021] (Year: 1996).*

Wang et al. "Development of a parallel optimization method based on genetic simulated annealing algorithm" Parallel Computing, vol. 31, pp. 839-857; doi: 10.1016/j.parco.2005.03.006 [retrieved on Apr. 19, 2021] (Year: 2005).*

Wittman-Regis, Agnes, "International Preliminary Report on Patentability Regarding PCT/US2018/053118", dated Apr. 9, 2020, p. 6 Published in: CH.

Fang, Xiaopeng, "Engineering Design Using Genetic Algorithms", 2007, p. 115 Publisher: Iowa State University, Published in: US.

Wikipedia, "Evolved Antenna", Known to exist as early as Dec. 12, 2018, "Retrieved from https://en.wikipeida.org/wiki/Evolved_antenna", p. 3.

Wikipedia, "Evolver (Software)", Known to exist as early as Dec. 12, 2018, "Retrieved from https://en.wikipedia.org/wiki/Evolver_(software)", p. 1.

The Mathworks, Inc., "Genetic Algorithm", Known to exist as early as Dec. 12, 2018, "Retrieved from https://www.mathworks.com/discovery/genetic-algorithm.html", p. 2 Published in: US.

* cited by examiner 68.16

ANNEALING

Default Chance

| 0.05 |

Chance Step Size

| 0.005 |

Minimum Chance

| 0.005 |

Maximum Chance

| 0.5 |

Default Magnitude

| 0.05 |

Magnitude step size

| 0.005 |

Minimum Magnitude

| 0.005 |

Maximum Magnitude

| 0.75 |

Duration until new step

| 10 |

Chance step size when reverse annealing

| 0.005 |

Magnitude step size when reverse annealing

| 0.005 |

FIG. 23

MEMORY

Time until first memorization

| 100 |

Change in chance caused by first memorization

| 0.0025 |

Time until memorization strengthens

| 50 |

Change in chance caused by strengthening memorization

| 0.0025 |

FIG. 25

PARENTAGE

Parent pool size

2

Number of parents chosen from pool

REVERSION

Initial chance of reversion 0.005

Time until reversion chance changes

100

Change in chance caused by time being reached 0.005

FIG. 27

OTHER

Number of individuals per generation

| 15 |

Autostop mechanism

| Statistical Autostop |

Number of generations until autostop

| |

Assumed chance of improvement

| 0.99 |

Alpha Certainty

| 0.05 |

FIG. 28

TOOL AND METHOD FOR USING THE SAME

CLAIM OF PRIORITY UNDER 35 U.S.C. § 119

The present application for patent claims priority to Provisional Application No. 62/563,772 entitled "General Purpose Genetic Algorithm for Complex Problem Solving" filed Sep. 27, 2017, and assigned to the assignee hereof and hereby expressly incorporated by reference herein.

BACKGROUND

Field

The present invention relates generally to engineering tools, and more specifically to engineering design tools.

Background

Evolution by natural selection operates in nature by tending to pass genetic information from more "fit" individuals onwards. Over time, this results in a diverse set of solutions to naturally present challenges, i.e. survival and reproduction in a specific environment. In cases where a specific need has been selected for, incredibly specialized forms have come to exist, some which overcome even modern engineering capacities. Since the 1950's there have been efforts to replicate this process for the purpose of reaching solutions to complex problems or finding superior designs, while exceeding human biases in finding the solutions.

Towards this end, genetic algorithms can be used to most basically apply to complex problems to seek solutions or superior designs. Such solutions or designs are determined by testing an individual, or organism, and scoring that entity for fitness. The organism, design, or individual (as the terms are used interchangeably herein and in the plural is referred to as the species), an entity described by a series of characteristics. Such characteristics are defined to have an associated value, which might be represented in numeric, boolean, series of bytes, or any other unit measurement that gives the characteristic meaning.

Despite their potential for solving complex problem solving, several obstacles exist for reliable and consistent use of genetic algorithms.

SUMMARY

According to an aspect, a method for operating a design tool may include receiving at least one parent design and generating a plurality of first-generation design copies that each include a characteristic that has mutated from the parent design. New generations of design copies are successively produced from the additional design copies based on fitness testing the new generations of design copies. Characteristics from intergenerational design copies that are not within the same generation are utilized to perform intergenerational crossover, and a likelihood of a mutation of a design copy is increased in response to a threshold number of generations without an improvement in a fitness score of a design copy. New generations continue to be successively produced until a likelihood that any design copy with a higher fitness score will be produced is below a statistical threshold.

According to another aspect, an engineering design tool includes a design generation component configured to provide at least one parent design; a characteristic alteration component configured to generate a plurality of first-generation design copies of the parent design by mutating one or more characteristics of the parent design; a simulator configured to fitness test each of the first-generation design copies to enable a determination of which first-generation design copies will be copied to generate additional design copies; and a datastore configured to store a characteristic record of each of the design copies. In addition, a design evolution component is configured to successively produce new generations of design copies from the additional design copies and utilize the simulator to fitness test the new generations of design copies to determine which design copies are copied. In addition, the design evolution component is configured to access the datastore to obtain characteristics from intergenerational design copies that are not within the same generation to perform intergenerational crossover and increase a likelihood of a mutation of a design copy in response to a threshold number of generations without an improvement in a fitness score of a design copy while decrease a likelihood of a characteristic changing during mutation if the characteristic persists for a characteristic-threshold number of generations. The design evolution component is configured to automatically stop producing new generations of design copies when a likelihood that any design copy with a higher fitness score will be produced is below a statistical threshold.

BRIEF DESCRIPTION OF THE DRAWINGS

FIG. 23 depicts a screenshot of an exemplary user interface depicting user-definable parameter-value-fields associated with annealing;

FIG. 25 depicts a screenshot of an exemplary user interface with exemplary user-definable parameter-value-fields associated with memorization;

FIG. 26 depicts a screenshot of an exemplary user interface with exemplary user-definable parameter-value-fields associated with defining parentage;

FIG. 27 depicts a screenshot of an exemplary user interface with exemplary user-definable parameter-value-fields associated with permanence;

FIG. 28 depicts a screenshot of an exemplary user interface with exemplary user-definable parameter-value-fields utilized by the design evolution component.

DETAILED DESCRIPTION

Figure 1:
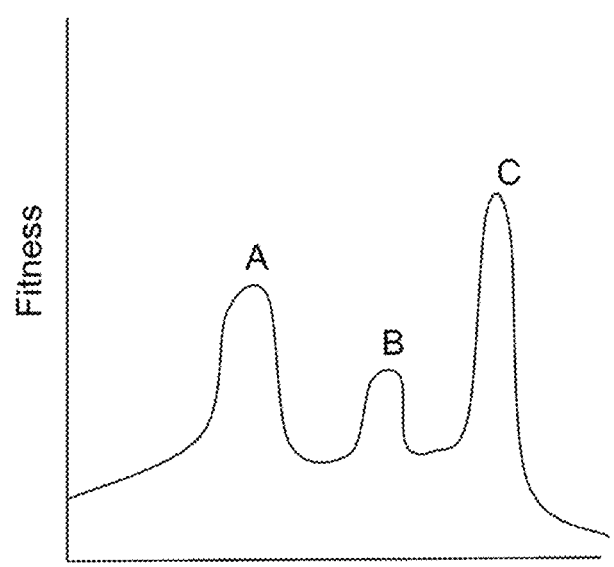
FIG. 1 is a graph of fitness consisting of several local maxima and one global maxima.

The following modes, features or aspects, given by way of example only, are described in order to provide a more precise understanding of the subject matter of several embodiments.

The reference in this specification to any prior publication (or information derived from it), or to any matter which is known, is not an acknowledgment or admission or any form of suggestion that the prior publication (or information derived from it) or known matter is conventional, routine, or forms part of the common general knowledge in the field of endeavor to which this specification relates.

The word "exemplary" is used herein to mean "serving as an example, instance, or illustration." Any embodiment described herein as "exemplary" is not necessarily to be construed as preferred or advantageous over other embodiments.

As discussed above, several obstacles exist for reliable and consistent use of genetic algorithms. More specifically, Applicant has found that efficiency, local maxima, and usability are particular issues and obstacles.

Efficiency.

A main issue has been limitations on computational processing resources, which with the more recent advances in computer processing power and storage availability, is presently much less of a constraint than historically has been the case. Notwithstanding, the computational resources needed to evaluate fitness and produce offspring in many cases can be significant, particularly as advances in technologies present even more complex issues. Further, simulation environments specifically require significant computational power to complete a project in a time-efficient manner. These obstacles have traditionally driven development of genetic algorithms toward considerations for efficiency, rather than certainty that an absolute maxima of a solution has been reached.

Local Maxima.

It is nearly impossible to determine whether any given design or solution is the best solution possible. Standard genetic algorithms become stuck in local maxima and fail to discover the more optimal solution through a global or absolute maxima.

Due to mistakes or flaws in the genetic algorithm or excess priority inherent in the genetic algorithm placed on efficiency concerns, solutions often reach a score which can then only improve through extreme mutation. Such extreme mutation results in a wider variety of offspring, and tends towards lower fitness. As such, the best solution is often prevented from occurring by the genetic algorithm or its components that get stuck within a local maxima range. There exist methods of overcoming local maxima which attempt to allow for greater mutation ranges. The more of these mechanisms which are used, the more certain one can be that an absolute maxima has been reached. However, these methods often require significant computational resources and thus are invariably compromised at the cost of lower efficiency.

These two prime obstacles of computational processing efficiency and overcoming local maxima are in direct conflict with each other as favoring one places a tension on the other. However, the advent of quantum computing along with rapid advancements made in conventional computing have made concerns over efficiency less relevant. This has redirected much of the focus of genetic algorithms back to overcoming local maxima. Furthermore, increased precision in machining has removed significant artificial limitations in genetic algorithms. These limitations were placed to mimic limitations in physical machinery, which ultimately translated organisms from digital models to physical representations. As a result, these changes have broadened the range of applications that genetic algorithms have been able to take on due to the increased accuracy of solutions that genetic algorithms are able to discover.

Usability.

A third primary obstacle for widespread and consistent use of genetic algorithms is the difficulty for their regular use with flexible user input of varying parameters. Genetic algorithm libraries are scarce and often poorly implemented for ease of developer or researcher use. The most widely used genetic algorithm software today, which is a plugin for MATLAB, offers very limited customization in implementing its genetic algorithm software while also being very cost-prohibitive for independent researchers or developers. The most viable alternative for developers and researchers today is to write their own genetic algorithm software from scratch in order to fully integrate with their custom evaluation mechanism and to provide the most utility within their domain. However, this is very time consuming and is often not feasible for users with limited resources.

Additionally, running genetic algorithms in conjunction with evaluation software is often very computationally intensive. In order to efficiently run genetic algorithms and receive useful results, specialized servers must be used. Custom server racks are cost and time prohibitive for a small or average size research lab or company, while online hosting services do not provide specialized software or hardware meant to maximize the efficiency of genetic algorithms. Further, often many simulators run with a graphical user interface (GUI). Testing new species on GUI-based simulators requires a lot of manual effort, since programming scripts cannot directly interface with the simulator software. This makes applying genetic algorithms to GUI-based simulators practically impossible. Unfortunately, most simulators are GUI-based, which rules out practical use of a vast amount of simulators—and thus a large number of domains—from the reach of genetic algorithms.

It is clear that as scientific and technological advancement continue, human design capabilities will become less capable of resolving new challenges. As such, a need exists for use of genetic algorithms that can overcome local maxima to better ensure complex problems are solved and superior designs achieved, while optimizing efficiency concerns of necessary computer programming resources. Further, a genetic algorithm that can be implemented for widespread practical use by researchers, developers, hobbyists and at large scale institutions is sought. While distinctions exist between complex problem solving, and the desire to discover a superior design for a project, these tasks will be referred to interchangeably and collectively as "complex problem solving" for the purposes of the present specification for determining an optimized physical solution.

Aspects disclosed herein address issues and problems discussed above and below. For example, methodologies inspired by genetic algorithms are disclosed herein that overcome local maxima and meaningfully address efficiency, while allowing for user input making the algorithms disclosed herein applicable to as wide of a field and audience as possible. Aspects remove the barriers of wide genetic algorithm application, while simultaneously increasing the effectiveness of genetic algorithms, to more optimally achieve global or absolute maxima and superior design for complex problem solving. Although some terms that are utilized herein are also used in other contexts that are not related to the presently disclosed design algorithms (e.g., in connection with describing biological evolution), this is merely for convenience in describing some aspects of the design methodologies disclosed herein. Specifically, the design methodologies disclosed herein include new, useful algorithms that are not found at all in natural, biological evolution.

Existing Frameworks

Much published in the field of genetic algorithms is through the work of John Koza.

U.S. Pat. No. 5,136,686 ("the '686 patent"). The non-linear genetic representation hierarchical structure in the '686 patent are built on executable programs or functions that can return fitness scores individually. This means each node in the structure is a construction module that can be executed to construct a data interface, but that each node does not actually represent data in itself. This also means mutations and crossover are applied on specific branches of the hierarchy. This separation of data results in unnecessary biases that affect the potential to overcome local maxima.

Some embodiments disclosed herein use attribute-based characteristics to construct a hierarchical data structure, where the entirety of the tree structure is a data entity and may be used as whole for executable purposes. In any embodiments, the individual branches may be mutated for efficiency purposes, but are not individually cherry-picked into separate generations as in the Koza prior art; thus, preventing the occurrence of unnecessary biases which result from Koza's assumptions.

U.S. Pat. No. 4,935,877 ("the '877 patent"). Reproduction and crossover are defined strictly as separate actions in the '877 patent that are applied to a genetic entity, with reproduction being logically equivalent to duplication. This limits the range of ways in which new offspring can be created, as all crossovers and mutations are based first in an exact replica of the parent.

Some variations disclosed herein treat reproduction and crossover as the same event, with crossover being a sub-action within the reproductive step. Some embodiments also introduce additional forms of mutations within reproduction, such as independent asexual mutations on the child. This innovation allows for a greater range of algorithm parameters for balancing the efficiency vs. maxima certainty problem.

U.S. Pat. No. 5,867,397 ("the '397 patent"). In the '397 patent, a basic entity is defined as a constructing action that can develop "a structure in a topological arrangement with component values." In other words, the genetic algorithms of the '397 pivot around mutating and selecting for new construction actions. These data-construction interfaces must be exposed in order to accept results generated from Koza's implementations. This would require simulators to be designed specifically around Koza's technique in order for genetic algorithms to be implemented, which is impossible for most users.

According to many embodiments, a basic entity is the arrangement of component values itself. Moving the logic of genetic algorithms to a data level introduces a lot more flexibility in terms of user-input as well as the applications that embodiments disclosed herein can be run on. As a consequence, many simulators are able to use data generated by these embodiments.

In general, aspects disclosed herein differ from the Koza prior art in every major step in the process of genetic algorithm implementation, from the representation of data to the mechanism of mutation. Algorithms that are utilized present an algorithm inspired by genetic algorithms that enable better, and a greater quantity of methods, for overcoming local maxima, while allowing user-input to determine the efficiency versus certainty conflict, and which capable of use on a wide variety of simulators, thus enabling better results for absolute maxima and more widespread application of complex problem solving.

U.S. Pat. No. 5,255,345 ("the '345 patent"). The '345 patent attempts to overcome maxima through an invention called ARGOT (Adaptive Representation Genetic Optimizer Technique), however its genetic algorithm processing steps focus on preserving efficiency of computing resources and thus inherently falls short of an optimal solution during complex problem solving. With the rise of faster computing, this focus on efficiency decreases the ARGOT genetic algorithm's ability to overcome local maxima.

Disclosed herein are several solutions to problems rooted in technologies of the prior art. Many aspects disclosed herein are more comprehensive in many of the operators that allow for adjustment of the boundaries of the solution space by being more effective in overcoming local maxima while optimizing efficiency. For example, ARGOT's simulated annealing technique only adjusts the magnitude of the mutation while embodiments disclosed herein adjust both the magnitude and the chance of the mutation. Changing both factors multiplies the effectiveness of fine-tuning and/or increases the likelihood of overcoming local maxima.

Furthermore, the mechanism for triggering ARGOT's operators are based on convergence (when the difference in a specific gene between generations reaches zero), while embodiments disclosed herein use iterations without improvement (of a design as a whole) as a more objective system of determining when a maxima has been reached, and when operators should be triggered therefore. To this end, some embodiments include a statistically grounded stopping mechanism which replaces human approximations with more meaningful values for determining when evolution has halted, and/or is unlikely to improve further. ARGOT's method of preserving traits, which is called "elitism" operates in an on/off state, preventing possible improvements to longstanding genes, whereas some embodiments (see modified mutation probabilities) adjust the probability of gene reappearance according to past success, thus allowing for mutation even after a gene has been successful for many generations. Most importantly, some embodiments explicitly allow for user input in all steps of the process making its genetic algorithms applicable to wide of a field and audience as possible.

The present disclosure is described herein in two parts. The first part describes innovative aspects for overcoming local maxima, describing methods and how they make it more effective than standard genetic algorithms for solving complex problems through archiving an optimal global or absolute maxima (these two terms are used interchangeably herein). The second part describes aspects of user interface input automation which allows clients, such as researchers or organizers, to utilize the design algorithms in their evaluation or simulation software.

Overcoming Local Maxima.

As described above, it is not practical to determine whether any given design or solution is the best solution possible using genetic algorithms, as solutions often reach a score which can then only improve through extreme mutation; thus, leading towards lower fitness. FIG. 1 is a graph of fitness consisting of several local maxima and one global maxima. Standard genetic algorithms become stuck in local maxima and fail to discover the more optimal solution.

As described further herein, many embodiments overcome the problem of local maxima while optimizing efficiency for complex problem solving through employing a wide range of techniques, altering potentially everything from the process of mutation, to types of reproduction, to determining when an absolute maxima is likely to have been reached. As a consequence, many undesirable issues of the prior art are removed and users may pursue the global maxima.

A distinction that separates some embodiments of the present disclosure from other frameworks is that every method used by the design algorithm is subject to user input, yielding high customizability for a wide range of applications. But it should be recognized that some variations do not require user-input.

Figure 2:
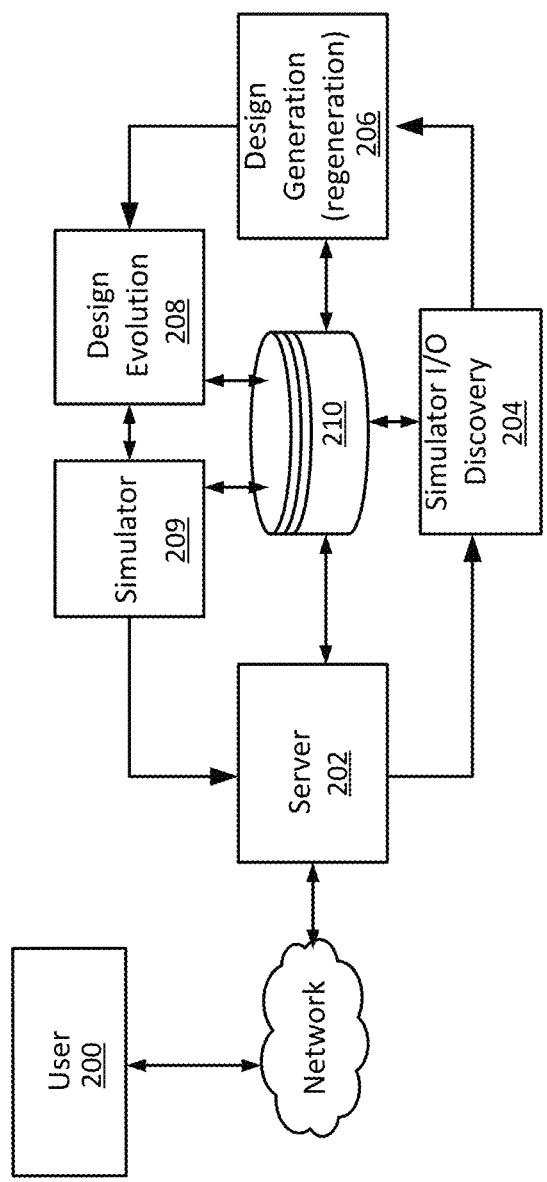
FIG. 2 is a flow diagram representing a high-level overview of a system depicting different aspects interacting with each other.

Referring to FIG. 2, shown is a diagram depicting a design system. As shown, a user 200 is in communication with a server 202 via a network (e.g., the Internet). And the server 202 is coupled to a simulator discovery component 204, a design generation component 206, a design evolution component 208, and a simulator 209. FIG. 2 depicts components that enable clients (e.g., the user 200) to access and use techniques disclosed herein with their simulator software. It should be recognized that the server 202 generally represents one or more servers, and that it is contemplated that multiple servers may be utilized to realize the server 202. As one of ordinary skill will appreciate, if multiple servers are utilized, some servers may be higher performing servers than other servers, and as a consequence, particular functions (e.g., simulator functions, mouse scripting functions, and design algorithm functions) may be distributed to the appropriate server based upon the workload that the function places on a server. Also depicted is a datastore 210 that is disposed to store data in connection with the functions of the server 202, simulator discovery component 204, design generation component 206, design evolution component 208, and the simulator 209. The datastore 202 may be realized by non-volatile memory including one or more hard drives and/or solid-state memory devices, which may be collocated or spatially distributed. As discussed further herein, the datastore 210 enables a characteristic record of each of the design copies to be maintained.

The user 200 generally represents at least a computing device (e.g., human operable computing device or automated device) that is capable of interacting with the server 202 via one or more network connections to enable the user 200 to interact with the server 202. The server 202 generally functions as an interface with the user 200, and the server 202 may be realized by a general-purpose computer that executes software to enable the functions of the server 202 described herein. More details about the functionality of the server 202 are disclosed with reference to FIGS. 22 through 30, but in many embodiments the server 202 serves up web pages for the user 200 to receive data and/or simulators and to provide data (e.g., design data and simulation results). For example, the server 202 enables the user 200 to upload a simulator (e.g., a simulator that is preferred by the user 200) as executable code that is "onboarded" for use in connection with the design evolution component 208.

The simulator discovery component 204, the design generation component 206, the design evolution component 208, and the simulator 209 may each reside on the same computer as the server 202 or one or more of the simulator discovery component 204, the design generation component 206, the design evolution component 208, and the simulator 209 may be instantiated on one or more other computers. Thus, the simulator discovery component 204, design generation component 206, design evolution component 208, and the server 209 may reside on one or more servers, which may include the same computing devices utilized to realize the server 202. In some implementations, the simulator discovery component 204, the design generation component 206, the design evolution component 208, and the simulator 209 are collated, but this is not required and in other implementations, the simulator discovery component 204, the design generation component 206, the design evolution component 208, and the simulator 209 may be distributed and connected by network connection over long distances.

Figure 3:
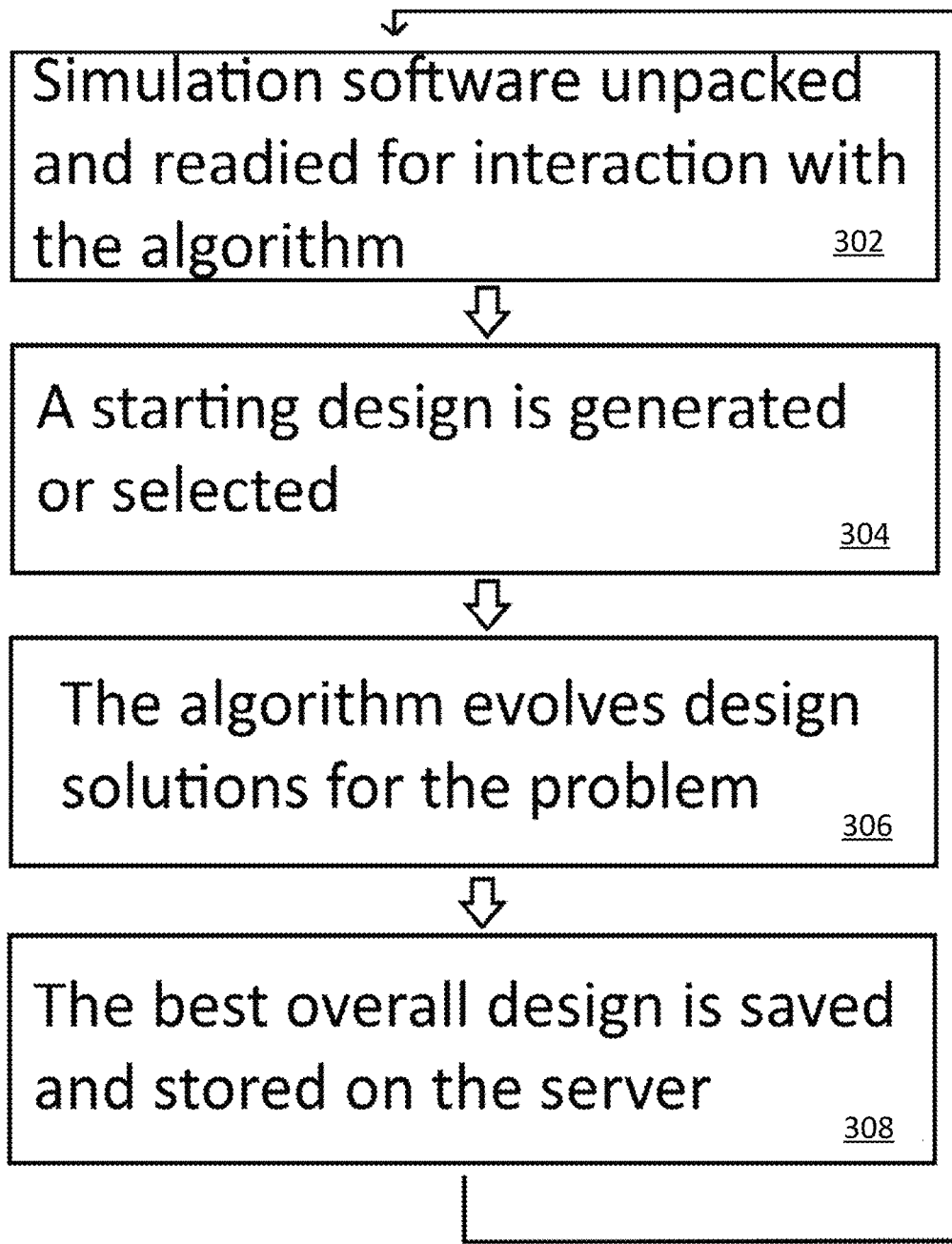
FIG. 3 is a flowchart depicting a method that may be carried out in connection with embodiments disclosed herein.

While referring to FIG. 2, simultaneous reference is made to FIG. 3, which depicts a method that is implemented by the system depicted in FIG. 2. In operation, the user 200 uploads their code, which may be simulator code and a procedural file, via the network, onto the server 202. The simulator discovery component 204 conducts a process of unpacking the simulator (also referred to herein as simulation software) to ready the simulator code for interaction with the algorithms disclosed herein (Block 302). For example, the server 202 may execute the simulator code to enable the simulator discovery component 204 to detect and discover aspects of the uploaded simulator code. After the simulator discovery component 204 discovers onboards the simulator code, the onboarded simulator code operates as the depicted simulator 209. The design generation component 206 then provides a starting design (also referred to herein as a parent design) (Block 304), and the design evolution component 208 then evolves design solutions (Block 306). For example, an individual starting design may initially be mutated to generate a number of, N, first-generation design offspring. Then, additional, second-generation, design copies may be generated by employing sexual reproduction to the first generation of offspring. In turn, each of the second-generation offspring may be mutated to generate another generation of offspring. Thus, the design evolution component is configured to successively produce new generations of design copies from previous generations of design copies and utilize the simulator to fitness test the new generations of design copies to determine which design copies are copied.

As discussed further herein, data characterizing the design copies of each generation may be persistently stored in the datastore 210 to enable intergenerational crossover. Subsequent generations continue to evolve by intergenerational crossover (e.g., sexual or polysexual) and additional mutations of the design copies produced by the intergenerational crossover. The design solutions are captured in one or more design copies (which are analogous to organisms), and a best overall design is stored and saved on the server 202 so that the user 200 may interact with the resultant design via a web interface provided by the server 202 (Block 308). As disclosed herein, the several algorithms include many aspects that go well beyond conventional genetic algorithms to enable an improved, machine-implemented, design tool that may be used across many technological fields including, without limitation, aerospace, chemical engineering, mechanical engineering, electrical engineering, and applied material sciences.

Figure 4A:
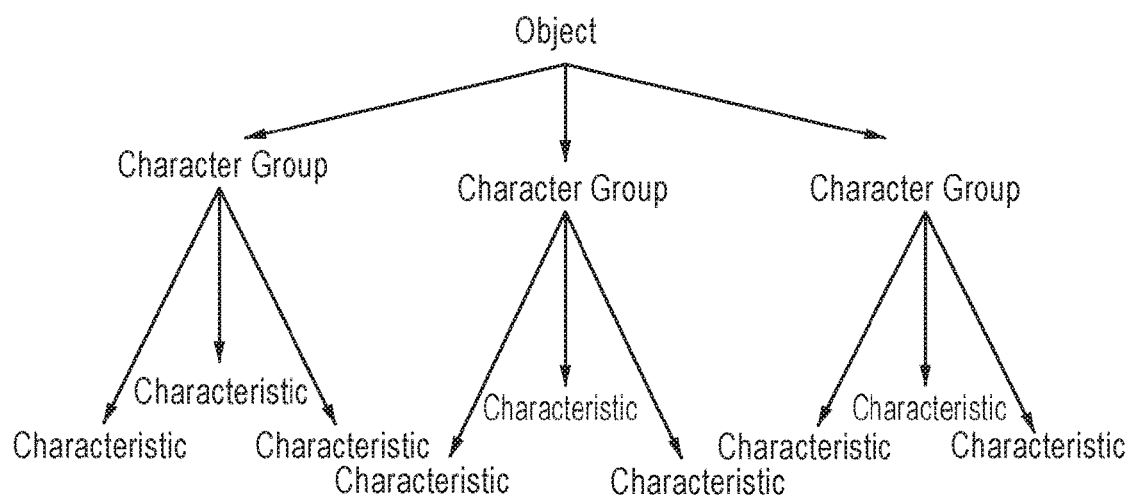
FIG. 4A illustrates a general example of a nonlinear genetic representation of an engineering design.

In many embodiments, data is stored (e.g., in the datastore 210) in a manner that is similar to how DNA is stored in biological organisms. However, instead of an array-like chain of DNA bases, a non-linear genetic representation in the form of a tree-based structure is utilized as represented in FIG. 4A. As shown in FIG. 4A, characteristics are grouped logically in a hierarchy where each parent node represents a unique characteristic, and the leaf nodes (nodes with no children) may contain numerical values that correspond to its parent character group. These leaf nodes may contain all of the numerical values in some embodiments.

FIG. 4A generically demonstrates this tree-based structure where character groups represent more general design characteristics, and more specific characteristics fall under each character group. The top-most root node (generally referred to as an object in FIG. 4A) represents a design as a whole. This design depicted in FIG. 4A has three high level character groups, but this is only exemplary. Although not depicted, it should be recognized that a character group may also include a child character group, and that child character group may include several characteristics. The arrows indicate parent to child relationships, going from parent to child.

Figure 4B:
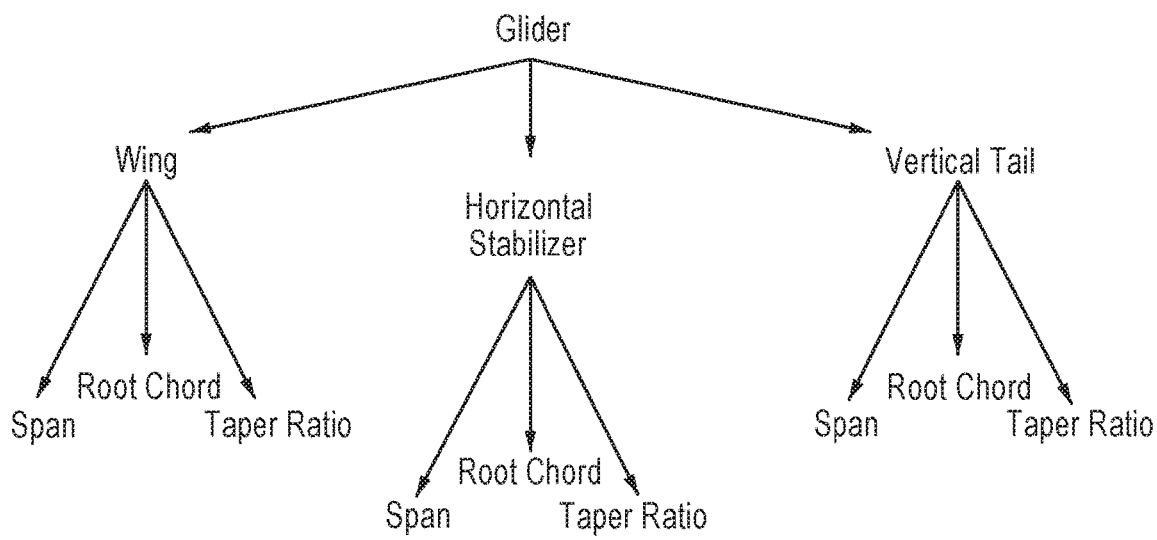
FIG. 4B illustrates a specific example of a nonlinear genetic representation of an engineering design.

Referring next to FIG. 4B, shown is an exemplary data structure including design data for an exemplary glider. As shown, the character groups for this exemplary glider include a wing group, a horizontal stabilizer group, and a vertical tail group. The characteristics of the wing include span, root chord, and taper ratio. The characteristics of the horizontal stabilizer include span, root chord and taper ratio, and the characteristics of the vertical tail also include span, root chord, and taper ratio.

In situations where a design object has multiple copies of the same characteristic, the singleton node of that characteristic may be replaced with a node that encapsulates an array of each copy of the characteristic. Each characteristic copy may have its own corresponding children nodes, but all of the sibling characteristics are related to the parent node character group through a single association. Note that a copy does not necessarily indicate exact replication. The characteristic structure may be identical (and in some embodiments the characteristic structure is identical), but the values for those characteristics may be different (and in many embodiments are different).

Figure 4C:
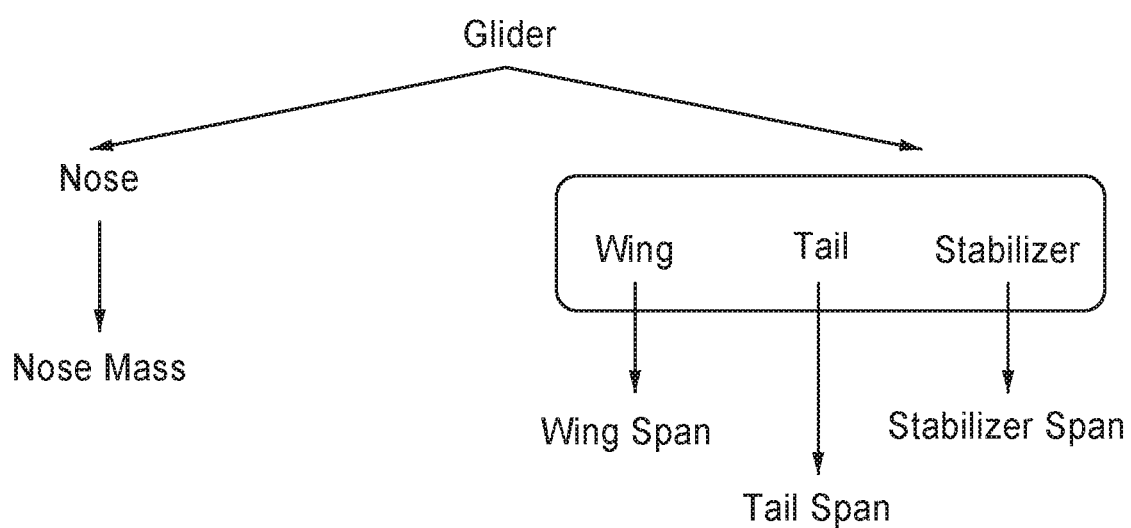
FIG. 4C illustrates an example of encapsulation of an array of each copy of a characteristic in a nonlinear genetic representation of an engineering design.

FIG. 4C exemplifies this association, where an exemplary glider design has multiple characteristic copies of the same span characteristic. The copies need not be exactly identical in terms of the values corresponding to the characteristics (the leaf nodes), however the characteristics (also referred to herein as attributes) and sub-characteristics (also referred to herein as sub-attributes) are identical (meaning the structure of the sub-trees are identical). Some embodiments provide a mechanism to encapsulate all of the copies into one node branching from the parent, but within it contain all the copies separately. As shown, wing, tail, and stabilizer character groups are encapsulated in this example, and this encapsulation includes the wing span, tail span, and stabilizer span characteristics separately.

This tree-based representation of data is superior to traditional array-based DNA structures because associations between the different characteristics of an object are stored (e.g., in the datastore 210). This makes it far more computationally and space-efficient to run any sort of method, such as mutation, on the tree. Related elements may be grouped and computed together in one step rather than iterating through a linear array to identify associations (which is a computational inefficiency) and without storing a separate array of associations (thus avoiding space inefficiency). Furthermore, having an association-based data structure allows for much more than just a design-attribute classification hierarchy. It allows for the efficient storage of additional associations between characteristics utilized by algorithms (further disclosed herein), such as genetic linkage, which will be described in more detail. The tree-based encapsulation of data disclosed herein is also superior to traditional linear genetic representation for data visualization.

Figure 5:
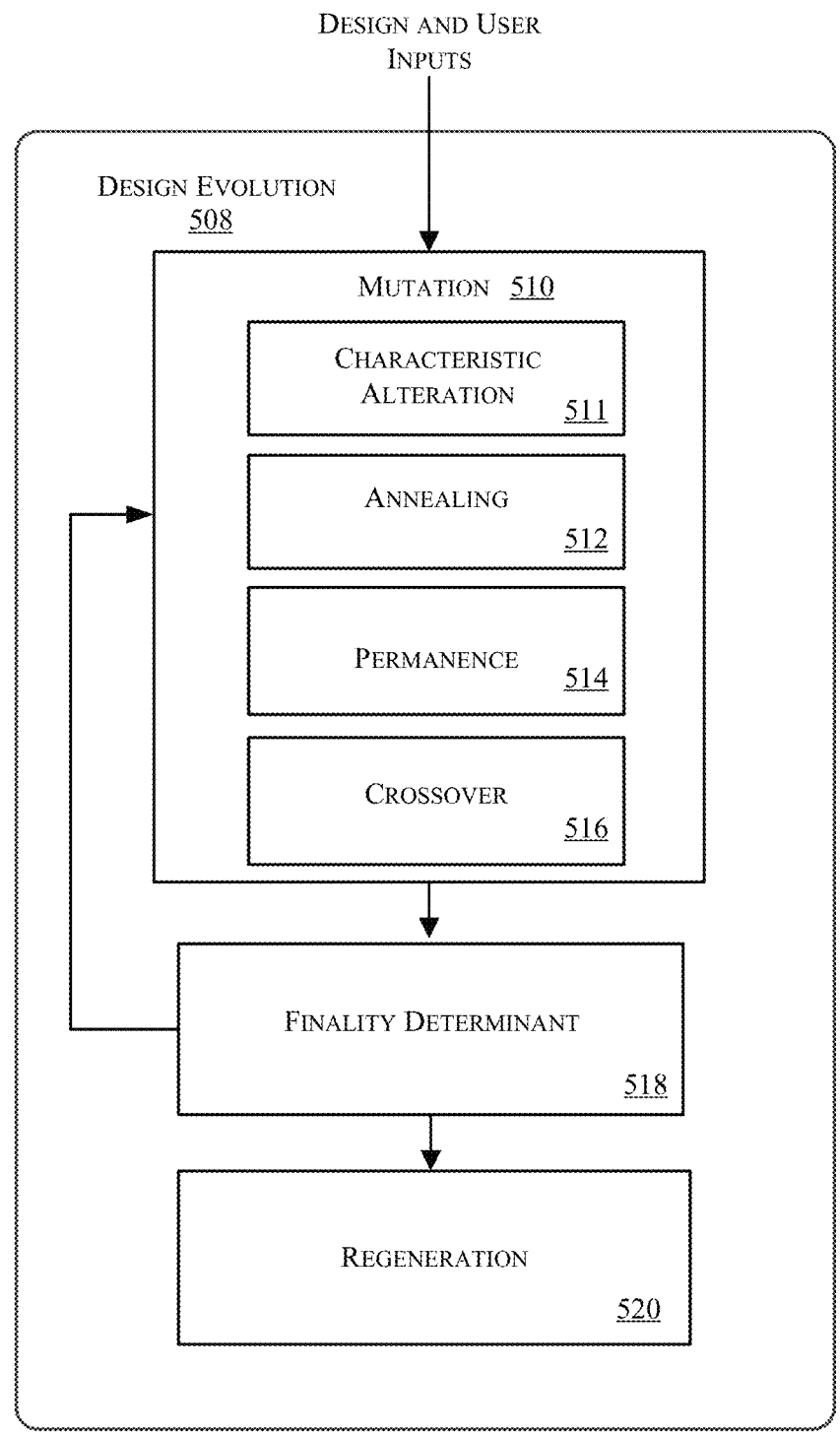
FIG. 5 is a block diagram depicting aspects of an exemplary embodiment of the design evolution component shown in FIG. 2.

Referring next to FIG. 5, shown is a block diagram depicting an exemplary embodiment of a design evolution component 508 that may be used to realize the design evolution component 208 depicted in FIG. 2. As shown, the design evolution component 508 depicted in FIG. 5 includes a mutation module 510, a finality determinant module 518, and a regeneration module 520. The mutation module 510 includes a characteristic alteration component 511 an annealing component 512, a permanence component 515, and a crossover component 516.

The depicted components in FIG. 5 may be realized by hardware or software in connection with hardware. In many embodiments, the depicted components are realized by software executed algorithms that are executed by a general-purpose computer, and in other embodiments, the depicted components may be realized by specially designed hardware that is utilized to execute software executed algorithms. In yet other embodiments, the depicted components are realized by hardware that is specifically designed and/or configured to implement the functions of the depicted components. For example, application-specific integrated circuits/or and field programmable gate arrays may be utilized to realize the depicted components.

Figure 6:
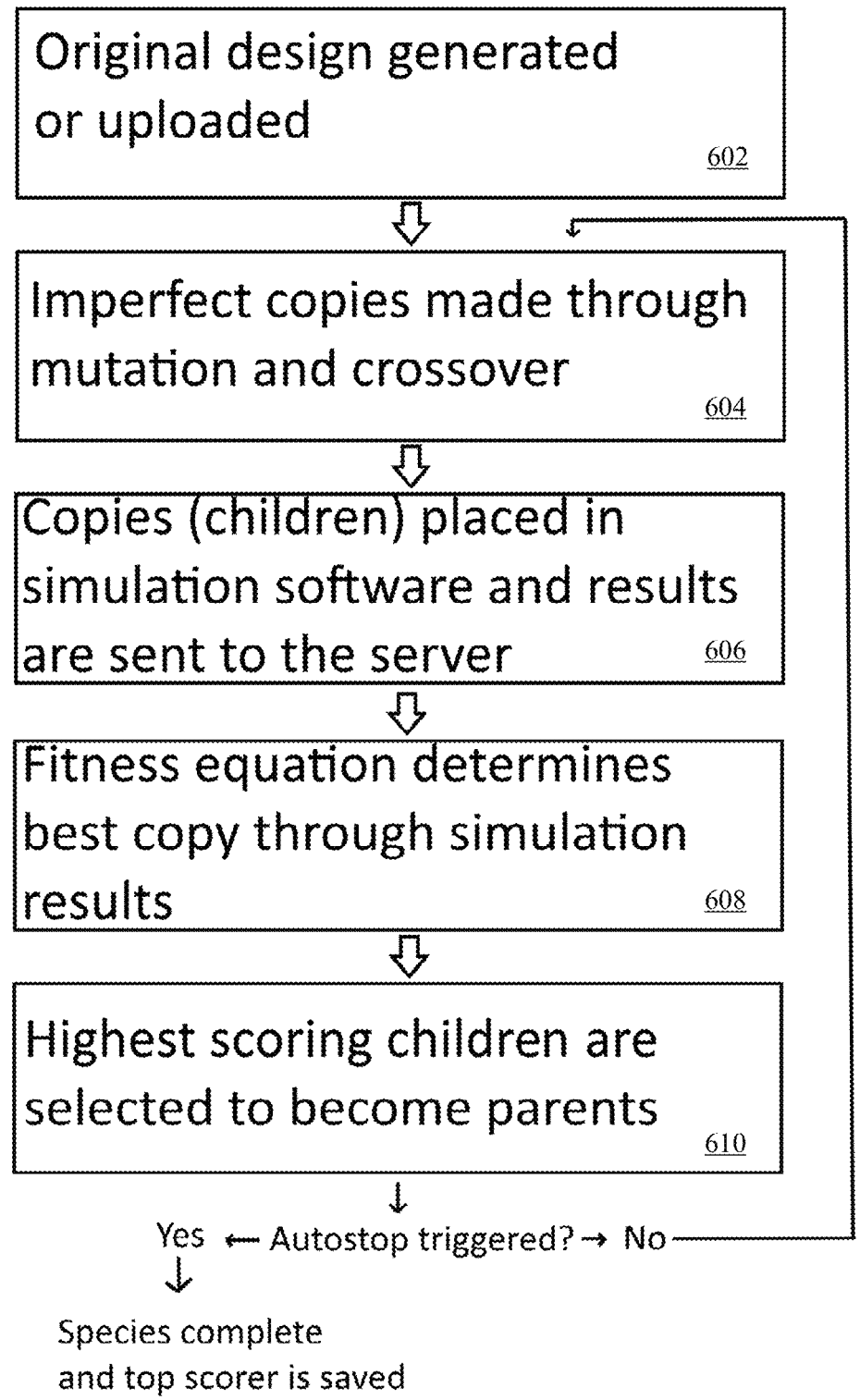
FIG. 6 is a flowchart depicting an exemplary method that may be traversed in connection with embodiments disclosed herein.

While referring to FIG. 5, simultaneous reference is made to FIG. 6, which is a flow chart depicting a method that may be traversed in connection with FIG. 5 and other embodiments disclosed herein. As shown, an original design is provided (e.g., by the design generation component 206 generating the design) or uploaded by a user (Block 602). The mutation module 510 generates imperfect design copies of the original design through mutation and crossover (Block 604). It should be recognized that the functions of the mutation module 510 cannot be performed mentally or by hand and require utilization of a machine, such as a computer.

The imperfect design copies are placed in the simulator 209 and results are sent to the server 202 and stored in the datastore 210 (Block 606). A fitness equation is then utilized to test the design copies to determine "best" design copies in view of the simulation results (Block 608). As shown in FIG. 6, the highest-scoring children are selected to become parents (Block 610), and the method described with reference to Blocks 602 to 610 is repeated until an auto-stop is triggered (Block 612). When the auto-stop is triggered, the design process is complete and the resultant top scoring design copy (also referred to herein as a species) is saved.

Figure 7:
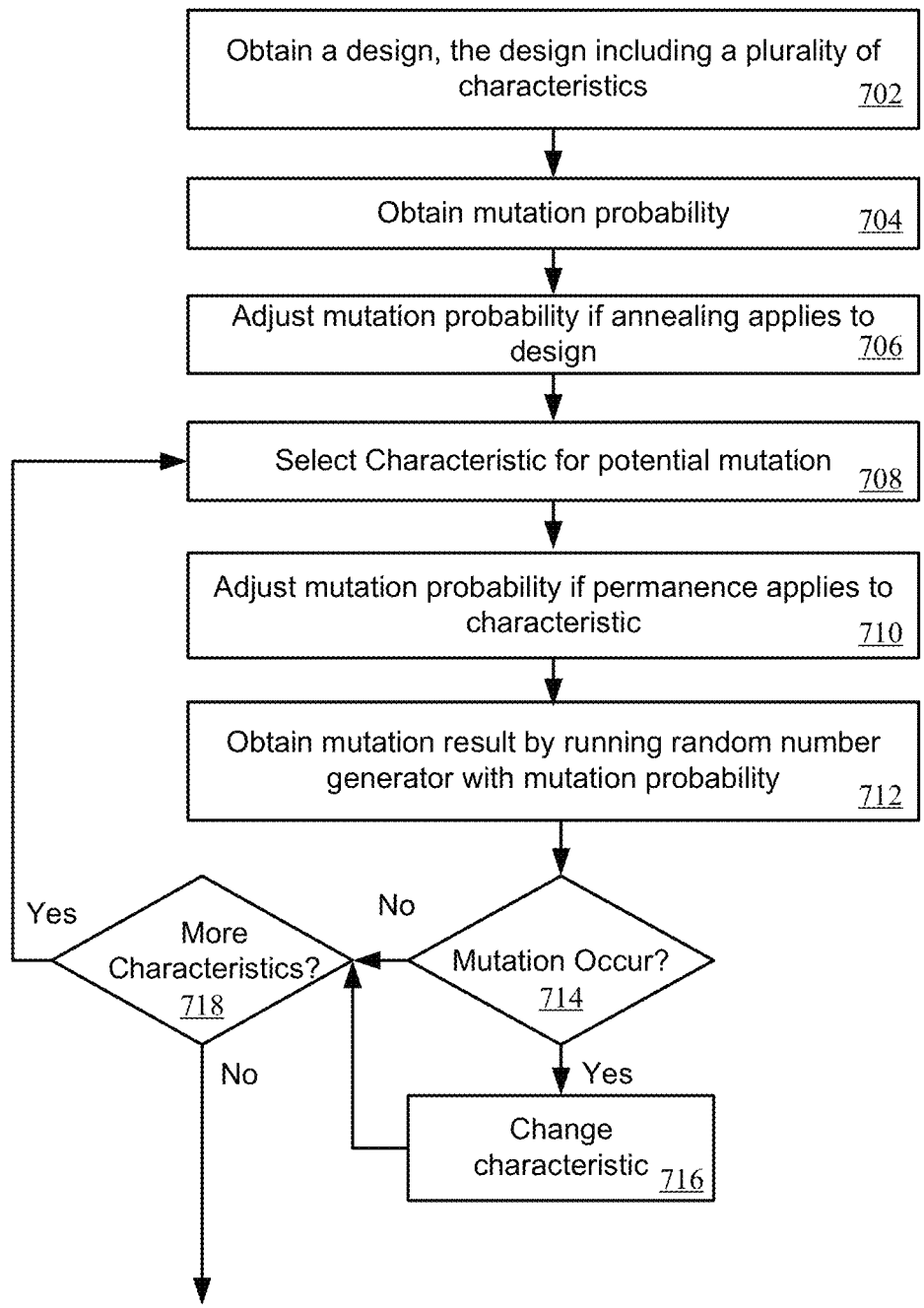
FIG. 7 is a flowchart depicting a method for mutating a characteristic of a design.

Referring to FIG. 7, shown is a more detailed flowchart depicting steps of a method that may be carried out by the mutation component 510 depicted in FIG. 5. As shown, the mutation module 510 obtains a design that includes a plurality of characteristics (Block 702). Some embodiments of the design generation component 206 enable the user 200, at the option of the user 200, to provide an initial design, or the design generation component 206 may generate the initial design by randomly generating characteristics. FIG. 4B provides specific examples of characteristics associated with gliders, but depending upon the particular design that is being developed, the characteristics may be electrical component types and parameter values; aspects of power (voltage, current, and phase information); chemical types and values; electromagnetic structures and associated values; optical structures and associated parameter values; and material types and parameter values that characterize the material types.

The methods for improving efficiency while overcoming local maxima can be broken down into multiple categories, each of which have their own internal processes which may be subject to user input. It should be recognized that the various aspects disclosed herein to improve efficiency and/or overcome local maxima do not need to be collectively implemented to obtain beneficial solutions to technical problems. For example, Applicant has found that in many instances allowing the design generation component 206 to generate a design provides improved effectiveness over utilizing a user-generated design.

As shown, the mutation module may also be configured to receive a mutation probability (Block 704). The mutation probability may be a default value or the user 200 may provide a mutation probability. As shown, the annealing component 512 may adjust a mutation probability if annealing (discussed further below) applies to the design (Block 706). The adjustment of the mutation probability if annealing applies (Block 706) is another example of an aspect that provides substantial benefits independent of other aspects disclosed herein. In other words, the several technical aspects disclosed herein need not be performed in combination to realize benefits.

As depicted, a characteristic is selected for mutation (Block 708), and if permanence applies to the characteristic, then the mutation probability may be adjusted (Block 710). Then a mutation result requires a machine to generate (e.g., by running a computer-implemented random number generator with the mutation probability as an input) (Block 712). For example, the mutation result may simply be a boolean value indicating whether or not mutation will occur relative to the characteristic selected at Block 708. If a mutation does occur (Block 714), then the characteristic alteration component 511 alters the characteristic of the design, and if there are more characteristics (Block 718), then the process described with reference to Blocks 708-718 repeats. If there are no more characteristics in the design, then the process of altering a characteristic ends. As an example, the span of a wing may be adjusted in response to the span characteristic being mutated. As another example, in an electrical design, an impedance of an electrical component may be altered, and as another example, an angle of an optical reflector in a pyrometer design could be adjusted.

Mutation.

In general, the characteristic alteration component 511 is configured to alter, by mutation, characteristics of a design based upon parameter values discussed below. Mutation is a process of altering characteristics of an individual design copy to create a new, unique individual design copy (also referred to herein as an imperfect design copy) to be tested for fitness. In some, but not all, implementations of the characteristic alteration component 511, mutation is subject to the following four parameter values: genetic range, magnitude, mutation probability, and permanence. And mutation can be modified by annealing (Block 706), which is a process that is described in greater detail below.

(a) Genetic range determines an absolute maximum and minimum values which a characteristic can have. This may be a user-input variable and may be determined by physical constraints, such as a material limitation (e.g., a type of material, such as a specific type of plastic, for a glider design). Mutations which exceed this boundary are either ignored in favor of the value of the boundary, or set the individual's total fitness to zero, per user-input.

(b) The magnitude of change is a factor by which a characteristic's values are multiplied to change a characteristic (Block 716) when the characteristic alteration component effectuates a mutation. The magnitude may be defined by two values:

(i) Maximum magnitude of change: may be a user input value which determines the upper and lower bound of the magnitude a characteristic can be multiplied by. This value may be affected by the implementation of annealing (e).

A higher magnitude of change increases the amount of change an individual can endure, making it less likely to be caught at a local maxima. In FIG. 1, a genetic algorithm iterating at peak B will be able to escape the local maxima by making a large enough of a fitness jump to overcome the valley between B and C. However this can also decrease efficiency due to the higher likelihood of fatal mutations (mutations which cause a significant drop in fitness) that do not lead to a higher peak. For example, if the algorithm has already achieved peak C in FIG. 1, any large jump across the graph will revert much of the progress it had made.

A lower magnitude of change decreases the amount of change an individual can endure, which allows for greater fine-tuning, but increases the risk of becoming stuck at a local maxima.

(ii) The increment of change may also be a user-input value which determines the lowest decimal place possible within the magnitude. This value is more likely be influenced by design limitations (machine precision) than by user preference. A "higher" increment (meaning fewer decimal places) slightly increases efficiency but may miss possible maxima due to the loss of precision. A "lower" increment (meaning more decimal places) helps to overcome local maxima by allowing for fine-tuning within a larger increment, at a cost of efficiency.

The mutation algorithm executed by the characteristic alteration component 511 (to change a characteristic at Block 716) operates by randomly selecting a value within the user input magnitude bound, matching the user input increment, and randomly selecting (according to the mutation probability (c)) whether or not to multiply a specific characteristic by that factor.

Magnitude is only relevant in characteristics which can be represented numerically. A characteristic that can be represented as an array of booleans, for example, would rely only on probability (c).

(c) The mutation probability obtained at Block 704 may be a user input-value which determines any given characteristics' chance of being mutated. The mutation probability may be a universal value, meaning all characteristics are equally likely to mutate (save for values which the user has opted not to mutate at all (d)).

A higher probability of change, similar to a higher magnitude (1bi) increases the likelihood of overcoming local maxima, at the cost of more fatal mutations and lower efficiency therefore.

A lower probability of change, similarly to a lower magnitude (1bi) allows for greater fine tuning and higher efficiency due to few fatal mutations, but increases the likelihood of the species becoming stuck at a local maxima.

(d) The permanence component 514 generally allows a modification to be made to the mutation probability and/or mutation magnitude relative to each characteristic. For example, the permanence component 514 may render certain characteristics unchangeable by mutation by the user. This may be important to physical limitations which are a feature of the design problem rather than a value which can be altered.

Annealing.

Figure 8:
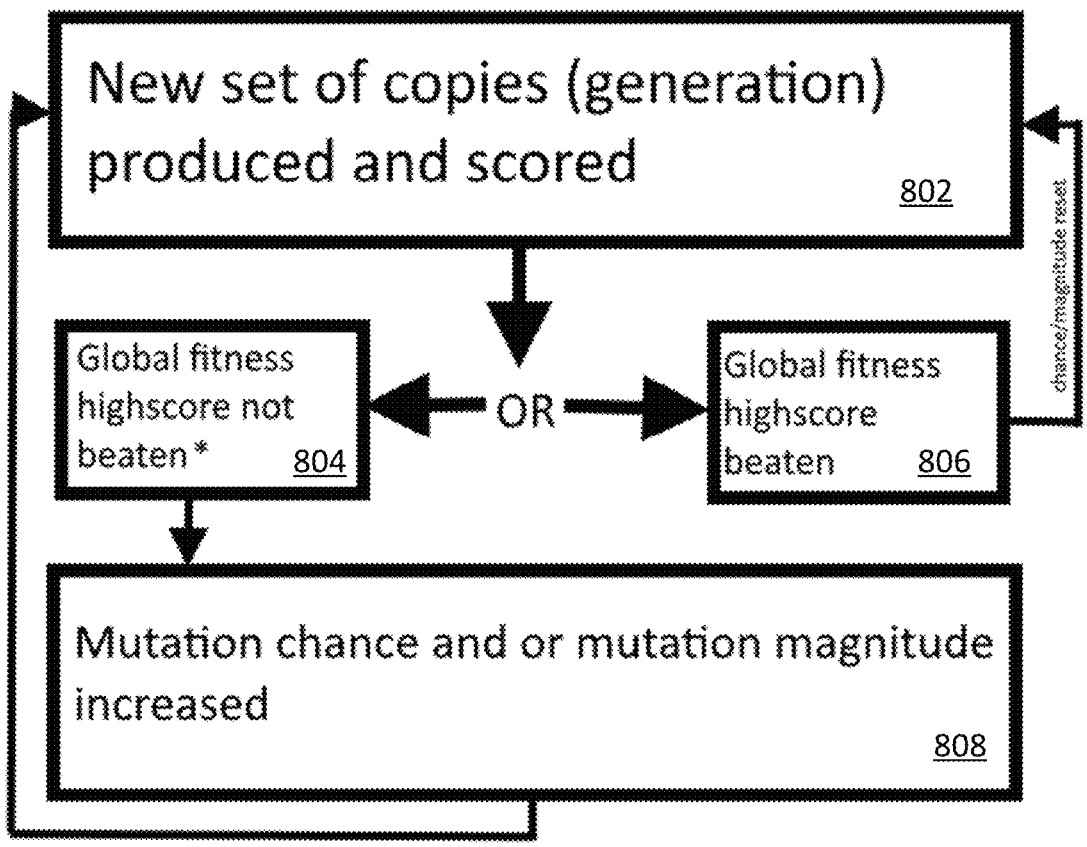
FIG. 8 depicts a method for annealing.

In general, annealing is the process of increasing magnitude and/or probability (b) (c) of mutation as it appears a maxima has been reached, for the purpose of making it more likely that the maxima will be overcome if possible, or decreasing those same values during a period of improvement, to allow for greater fine tuning in a less critical stage of evolution. Referring to FIG. 8, shown is an exemplary method for annealing that may be traversed by the annealing component 512 to carry out the adjustment to mutation probability (Block 706) and/or the mutation magnitude (Block 716). In general, the annealing component 512 is configured to increase a likelihood of a mutation of a design copy in response to a threshold number of generations without an improvement in a fitness score of a design copy. This threshold number of generations may be established by the user.

As depicted in FIG. 8, when a new set of design copies is produced and fitness-scored (Block 802), if a global fitness high score value is not beaten by one of the design copies in the set (Block 804), then the mutation probability (also referred to herein a mutation chance) and/or the mutation magnitude is increased (Block 808). But if a global fitness high score value is beaten by one of the design copies in the set (Block 806), then the mutation probability and mutation magnitude are not adjusted.

Annealing may be implemented according to one or more annealing values, which may be input by a user, or may be a default value. Exemplary annealing values include: 1) children without improvement; 2) increment of magnitude change; 3) a maximum magnitude change; 4) a factor increment; and 5) a maximum probability change.

(i) Design copies without improvement before the annealing process is triggered. This value determines how many less-fit design copies (in the case of stagnation) or more-fit design copies (in the case of rapid improvement) from the same parent are needed before annealing parameters are modified.

A higher value increases efficiency by decreasing the likelihood of a harmful mutation being overshadowed by a beneficial mutation, which could occur simultaneously in the midst of many changes.

A lower value increases likelihood of overcoming a local maxima as the number and magnitude of mutations increases more rapidly in a period of stagnation.

(ii) Increment of magnitude change. This may be a user input value which determines how much the magnitude of change varies as stagnation or rapid improvement occur. It can come in the form of two values:

1) Summative: A summative increment simply adds a user inputted value to or subtracts a user inputted value from the magnitude according to how many increments have occurred. This is more constant than a factor (b) and increases efficiency through decreasing the likelihood of fatal mutations as such.

2) Factor: A factor increment multiplies the magnitude by a user input value each time annealing is triggered. This is an exponential function, and increases the likelihood of overcoming maxima therefore, at the cost of lower efficiency due to the increased likelihood of fatal mutations.

A higher increment increases the likelihood of overcoming local maxima due to the greater magnitude of mutations possible, but decreases efficiency due to a greater likelihood of fatal mutations.

A lower increment increases the efficiency of the evolution due to decreasing the likelihood of fatal mutations, but increases the likelihood of becoming stuck at a local maxima due to the lower range of mutations possible.

(iii) The maximum magnitude change is a user input value which caps the change in magnitude at an absolute highest or lowest bound.

A lower maximum change increases efficiency for the reasons listed in the previous section. A higher maximum value increases chance of overcoming local maxima for the reasons listed in the previous section.

1) Increment of probability change: this may be a user input value which determines how much the probability of mutation changes as stagnation or rapid improvement occur. It can come in the form of two values:

2) Summative: A summative increment simply adds a user value to or subtracts a user value from the probability according to how many increments have occurred. This is more constant than a factor (b) and increases efficiency through decreasing the likelihood of fatal mutations as such.

(iv) Factor: A factor increment multiplies the probability by a user input value each time annealing is triggered. This is an exponential function, and increases the likelihood of overcoming maxima therefore, at the cost of lower efficiency due to the increased likelihood of fatal mutations.

A higher increment increases the likelihood of overcoming local maxima due to the greater number of mutations likely to occur, but decreases efficiency due to a greater likelihood of fatal mutations.

A lower increment increases the efficiency of the evolution due to decreasing the likelihood of fatal mutations, but increases the likelihood of becoming stuck at a local maxima due to the decreased probability of mutations occurring.

(v) The maximum probability change is a user input value which caps the change in probability at an absolute highest or lowest value.

A lower maximum change increases efficiency for the reasons listed in (4) above. A higher maximum value increases chance of overcoming local maxima for the reasons listed in (iv).

Those of ordinary skill in the art appreciate that the simulator 209 generally models a real phenomenon with a set of mathematical formulas. For example, a simulator may be a program that allows the user to observe an operation through simulation without actually performing that operation. Depending upon the design, a single resultant parameter value (e.g., sound pressure level of a transducer design) may be used as a fitness measure, or a collection of resultant parameter values (e.g., efficacy, luminance, and form factor in a lamp design) may be collectively assessed. In some embodiments, operational attributes are weighted so that a particular operational parameter may be weighted more heavily than another operation parameter (e.g., a fitness score may weight power consumption more heavily in a processor design than floating point operations per second).

Figure 9:
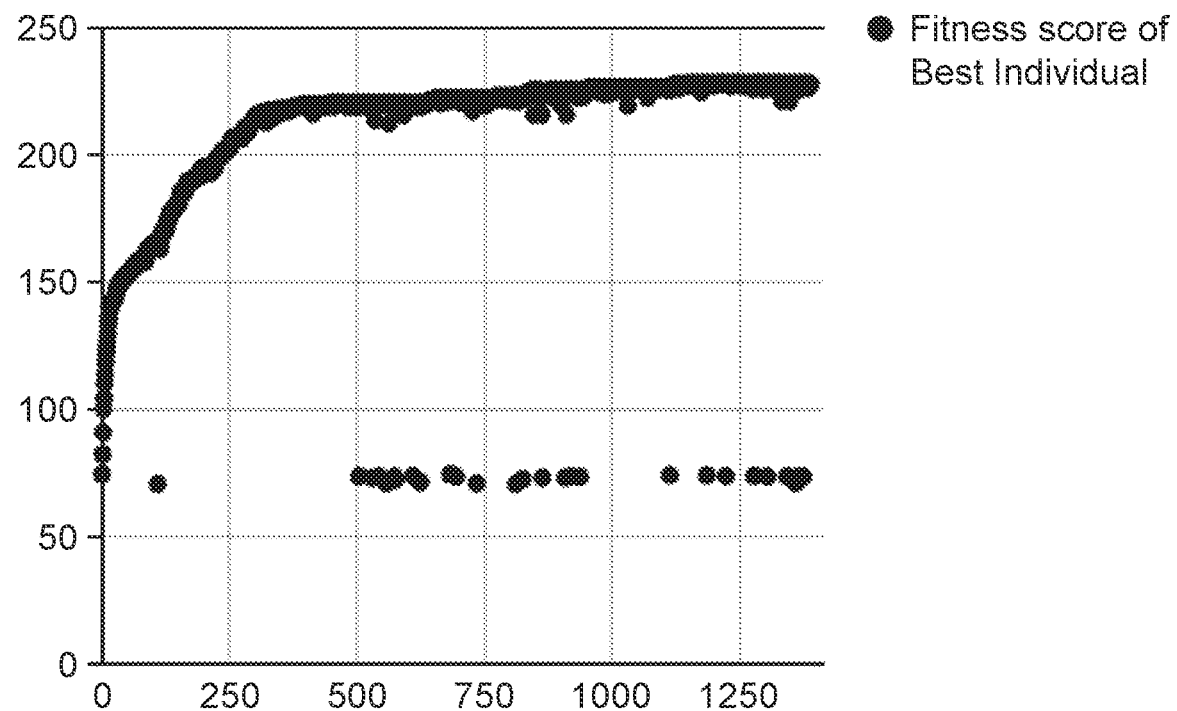
FIG. 9 shows an embodiment of the present invention represented by a graph of fitness score versus generation number that results from a test run on evaluator software.
Figure 10:
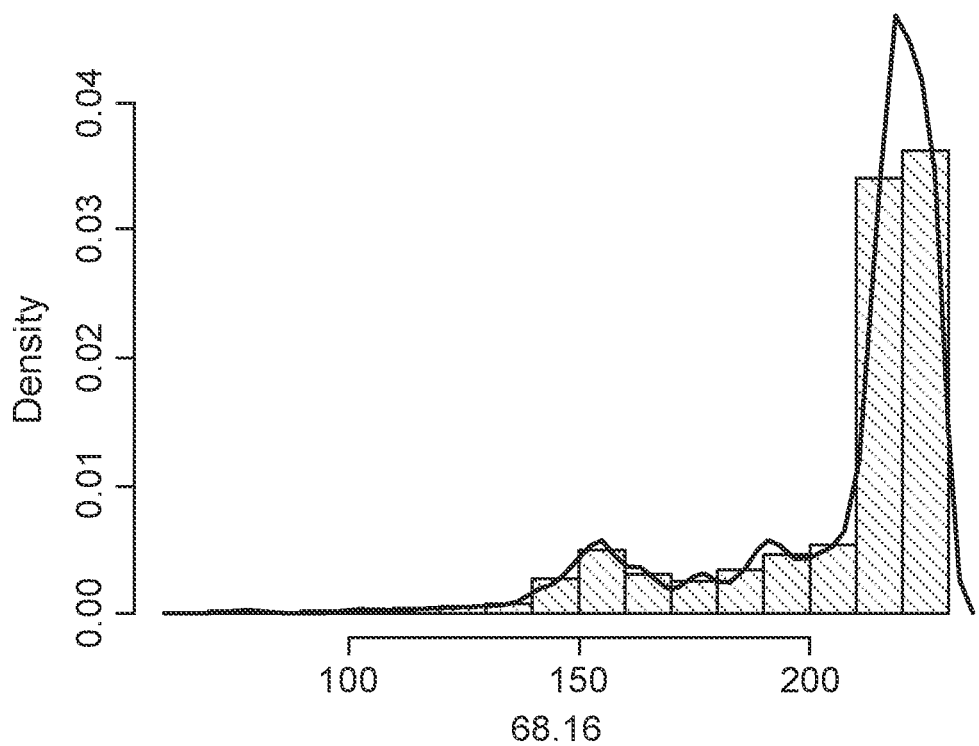
FIG. 10 shows a fitness distribution density graph based on the test scenario in FIG. 9.

Using an exemplary test run of annealing on the simulator 209, the results indicate annealing is a very powerful mechanism to overcome local maxima. FIGS. 9 and 10 are the results with annealing enabled. The irregularity of the graph in FIG. 9 and the tri-modal distribution in FIG. 10 indicate that multiple (two in this example) local maxima were overcome to achieve the final result. This asexual run in FIG. 9 was based on a 95% assumed chance of a better design (e.g., glider design), with a 2.5% desired certainty, and 20 children per generation, with the annealing technique applied. The high irregularity indicates that several local maxima were overcome, and as such, that annealing was effective.

Figure 11:
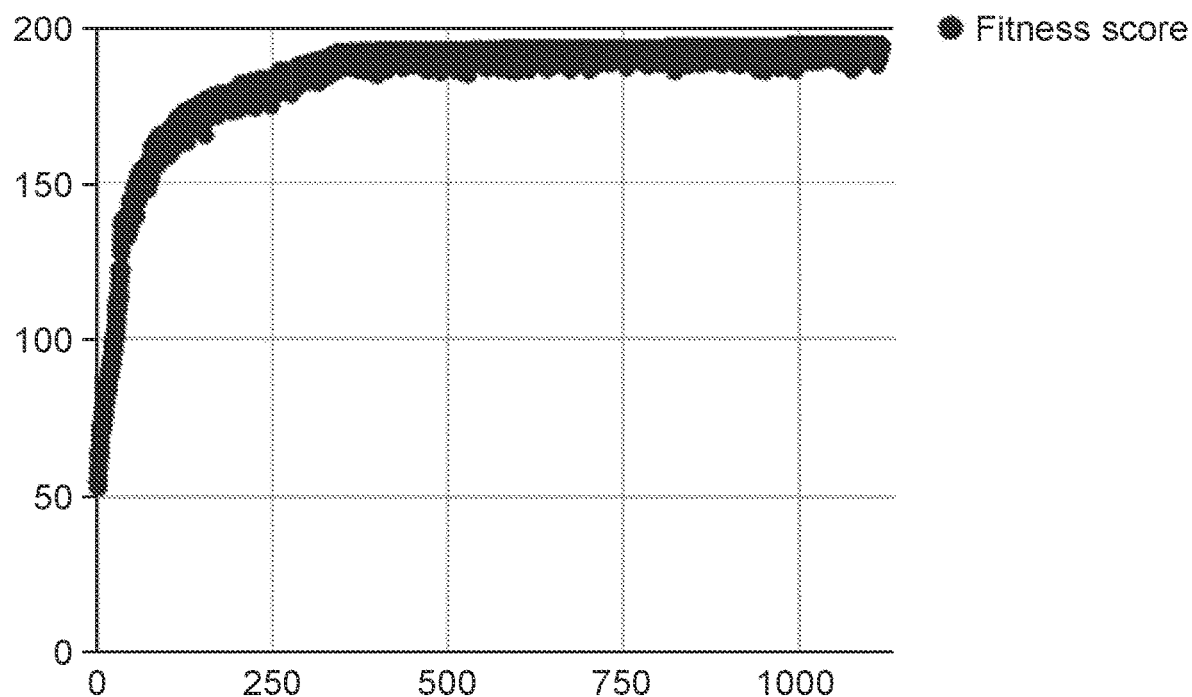
FIG. 11 shows a graph of fitness score versus generation number results from a test run on evaluator software using the same presets as those in FIG. 9, however the annealing technique was not applied.
Figure 12:
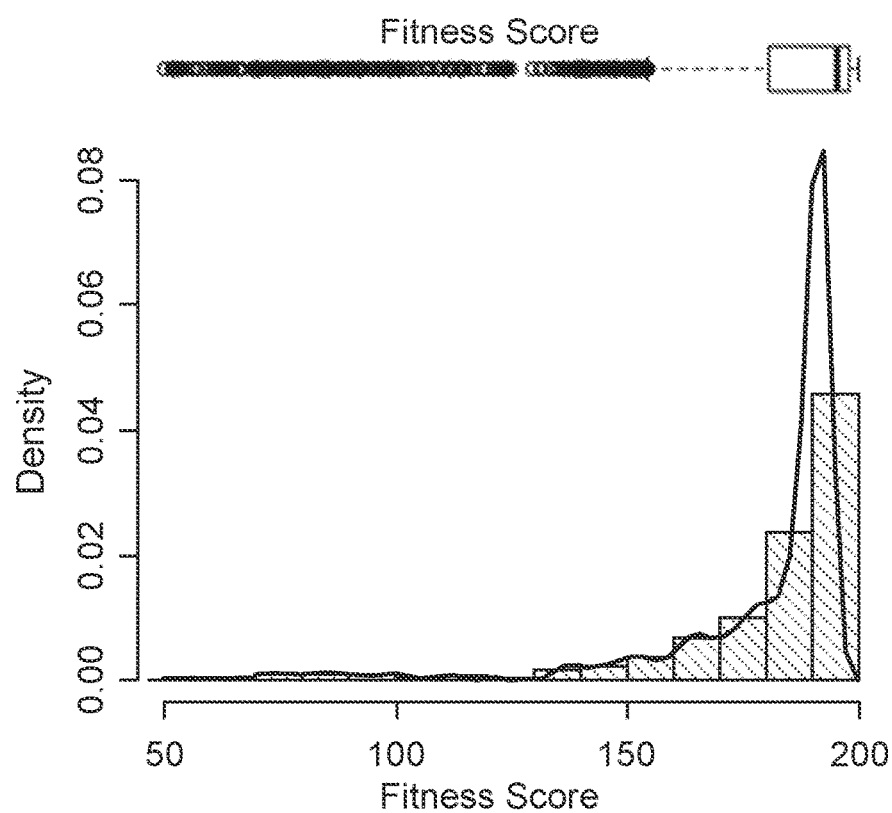
FIG. 12 is a fitness distribution density graph based on the test scenario in FIG. 11.

Meanwhile FIGS. 11 and 12 are the results of an embodiment without annealing. The smoothness of the curve represented in FIG. 11 and the unimodal distribution in FIG. 12 represent that few, if any, local maxima were overcome and that the final outcome is a local maxima, i.e., not a single local maxima was overcome making it likely that the species as a whole only achieved one local maxima. This can be further shown in that the final fitness score of the annealed version of an embodiment in FIG. 9 was 20 points greater than the version FIG. 12 without annealing, where the higher the score demonstrates the better solution for the design fitness score using the annealing approach described herein.

Figure 13:
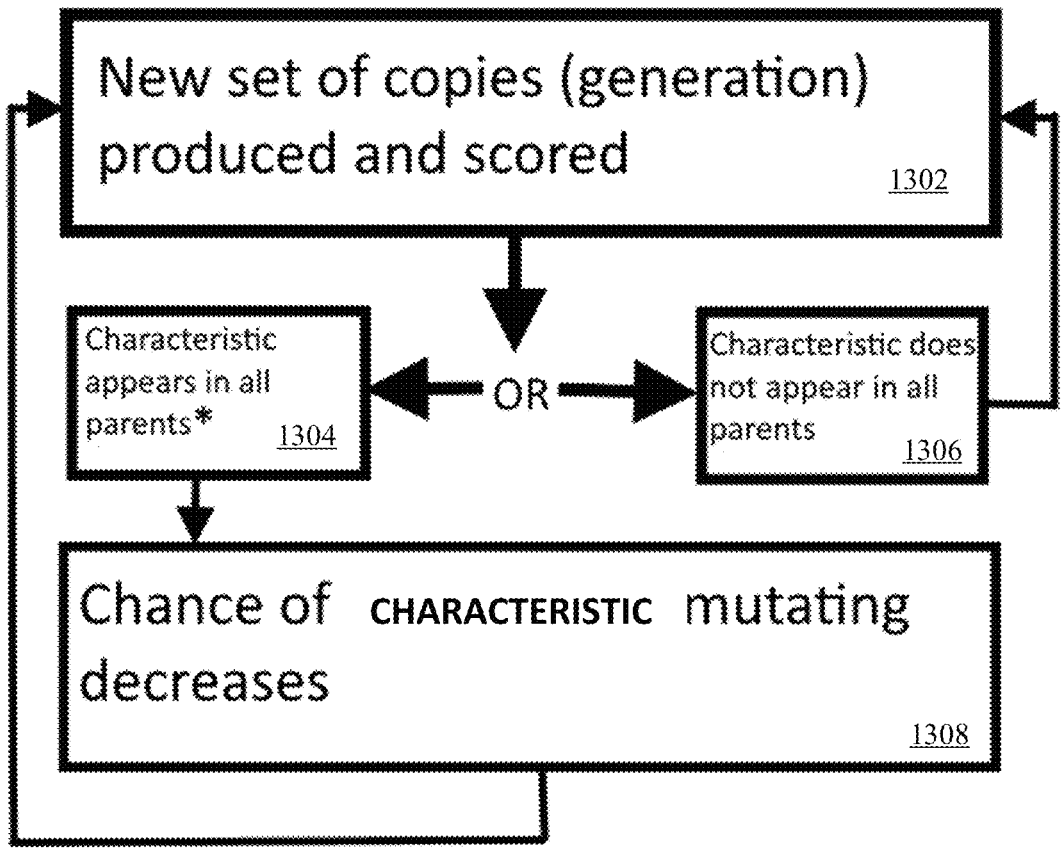
FIG. 13 is a flowchart depicting a method for implementing permanence.

Referring again to FIG. 7, the permanence functionality that is provided by the permanence component 514 is utilized to adjust the mutation probability on a characteristic by characteristic basis. For example, the permanence component 515 generally operates to decrease a likelihood of a characteristic changing during mutation if the characteristic persists for a characteristic-threshold number of generations. The characteristic-threshold number of generations may be established by the user 200 or may be a default value. FIG. 13 depicts an exemplary algorithm for carrying out the mutation probability adjustment (Block 710). As shown, after a new set of design copies is produced and scored (Block 1302), a determination is made as to whether a particular characteristic appears in all parents (Block 1304), and if so, the mutation probability that the particular characteristic will mutate is decreased (Block 1308). If a characteristic does not appear in all parents (Block 1306), then the mutation probability is not adjusted (Block 1306).

The application of permanence as disclosed herein functions to prevent characteristics that have persisted in design copies from being mutated out of subsequent design copies. The permanence functionality is applied because it has been found that characteristics that are reoccurring in design copies (e.g., over several generations of evolution) tend to be beneficial characteristics. Thus, the application of permanence generally decreases a likelihood of a characteristic changing during mutation if the characteristic persists for a characteristic-threshold number of generations. As a consequence, several embodiments provide the user 200 the option to store the genetic information of design copy's parentage in the datastore 210. This is advantageous for a study of which characteristics affected fitness the most and is necessary for the implementation of modified mutation probabilities.

In addition, characteristics that were once beneficial but have since disappeared from expression may be tracked and the likelihood of these no-longer present characteristics reoccurring may be decreased as the number of generations without those traits present continues.

The modification of mutation probabilities (Block 710) may utilize two values, similar to those used in annealing, but specific only to one characteristic: 1) characteristic-probability-increment and 2) characteristic-probability-change.

Characteristic-probability-increment may be a user input increment that indicates the number of fit designs in a row with or without a characteristic before its likelihood of reappearance is altered. A lower increment increases efficiency by increasing the chance of successful traits reappearing and thus decreasing the chance of harmful or fatal mutations. A higher increment increases certainty that an absolute maxima has been reached by allowing for a greater mutation range.

Characteristic-probability-change may be a user input value that may control the amount by which a characteristic's probability of reappearance is altered by its increment of disappearance or reappearance. This can come in the form of two values: a summative increment and a factor increment. A summative increment simply adds a user value to, or subtracts a user value from, the probability according to how many increments have occurred. This is more constant than a factor and increases efficiency through decreasing the likelihood of fatal mutations as such. A factor increment multiplies the probability by a user input value each time annealing is triggered. This is an exponential function, and increases the likelihood of overcoming maxima therefore, at the cost of lower efficiency due to the increased likelihood of fatal mutations.

Regardless of the subset values, implementing modified mutation probability increases both the efficiency and the certainty achieved by the genetic algorithm. This is due to a decreased likelihood of a harmful mutation destroying a beneficial characteristic and remaining in the population do to an unrelated mutation which dramatically increased fitness. Essentially, this provides a memory which prevents a design copy from having to independently re-evolve any given gene due to a fluke in its evolution.

Characteristic linkage is a permanence-related aspect that operates similarly to modified mutation probabilities, however characteristic linkage tracks groups of characteristics that remain together rather than individuals. In an identical manner to modified mutation probabilities, characteristics that have appeared together in fit individuals are tracked and a likelihood of appearance that the linked characteristics will appear together as a unit is increased or decreased according to their repeated success or repeated decline respectively. The permanence component 515 may be configured to track linked-characteristics which have appeared together in fit designs and increase a likelihood of appearance of the linked-characteristics is subsequent design copies.

Figure 14:
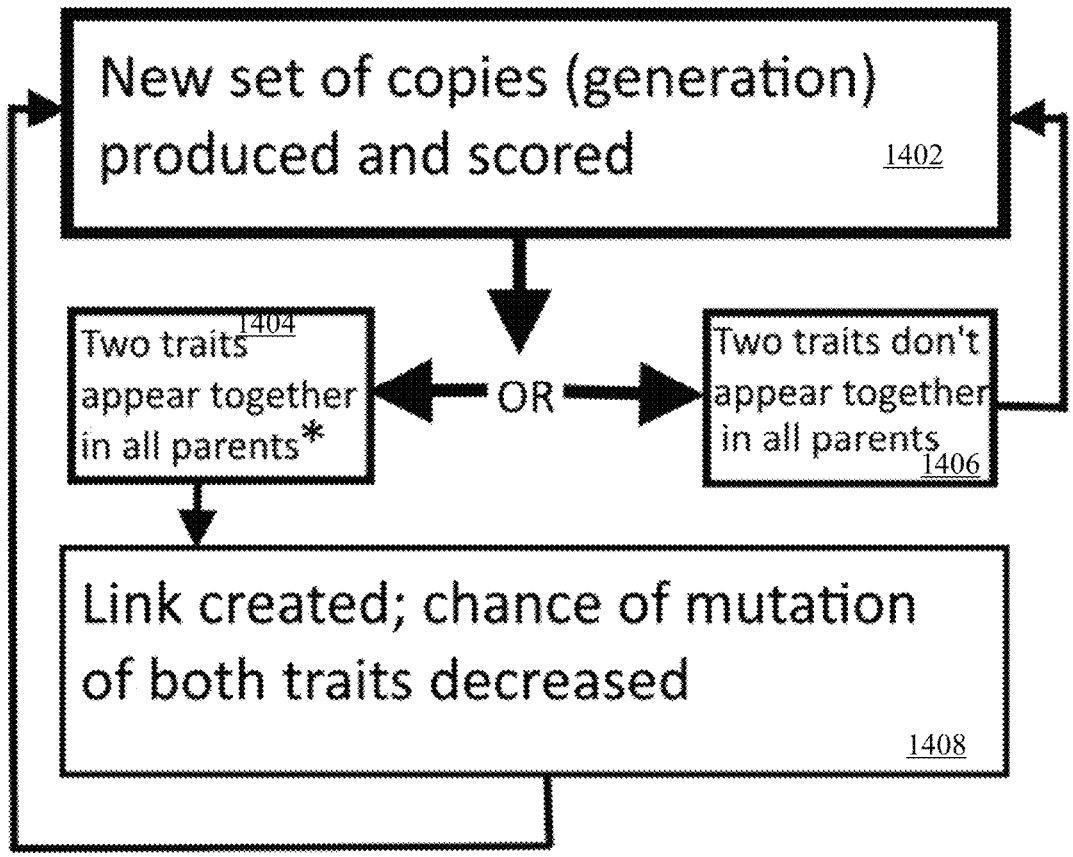
FIG. 14 is a flowchart depicting a method for implementing linkage.

As shown in FIG. 14, which is a flow chart depicting a method for adjusting the mutation probability, after a new set of copies is produced and stored (Block 1402), a determination is made as to whether sat least two traits appear together in all parents. If the two characteristics appear together in all parents (Block 1404), then a link is created (e.g., tracked by storing the link indication in memory), and a chance of mutating each of the linked characteristics is decreased (Block 1408). It should be noted that it may take several generations of linked-characteristics persisting before the probability is adjusted (at Block 710).

Characteristic linkage increases efficiency and certainty of an absolute maximum by decreasing the likelihood of a grouping of traits which are only beneficial in a group from suffering the loss of one member and thus setting back the design copy, and preventing the design copies from having to re-evolve a rare and beneficial combination of characteristics.

Figure 15:
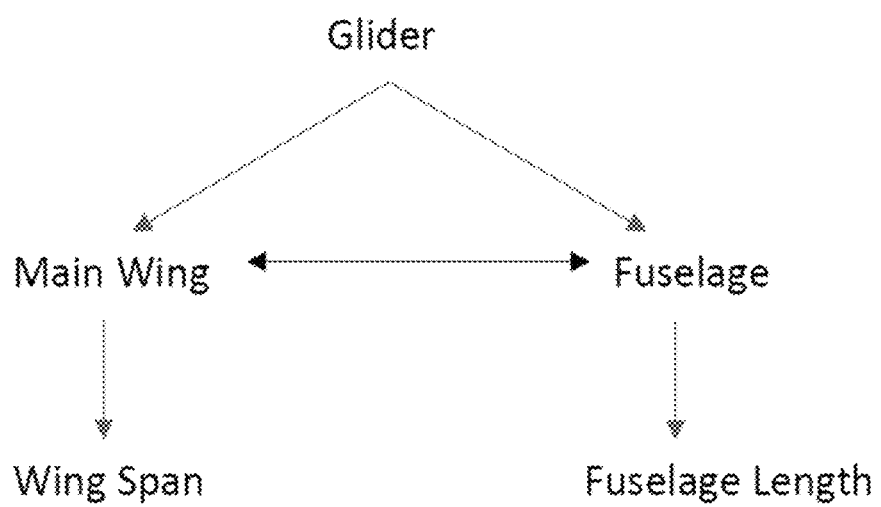
FIG. 15 is a representation of a design that depicts an example of linkage.

FIG. 15 shows how characteristic linkage may be stored in a portion of a data structure representation for an exemplary glider, where the double-ended arrow demonstrates characteristic linkage between a main wing and fuselage character groups. A bidirectional vector is used to distinguish itself from unidirectional (traditional) parent-child relationships. Additionally, links only traverse horizontally (between unrelated characteristics, vertical traversal would be parent-child relationships), thus preventing the risk of creating cycles within characteristics. This bidirectional vector differentiates itself, and indicates whether two genes are linked. Since unrelated attributes are linked, this avoids the dangers of creating a cycle within the tree-based genetic representation.

Figure 16:
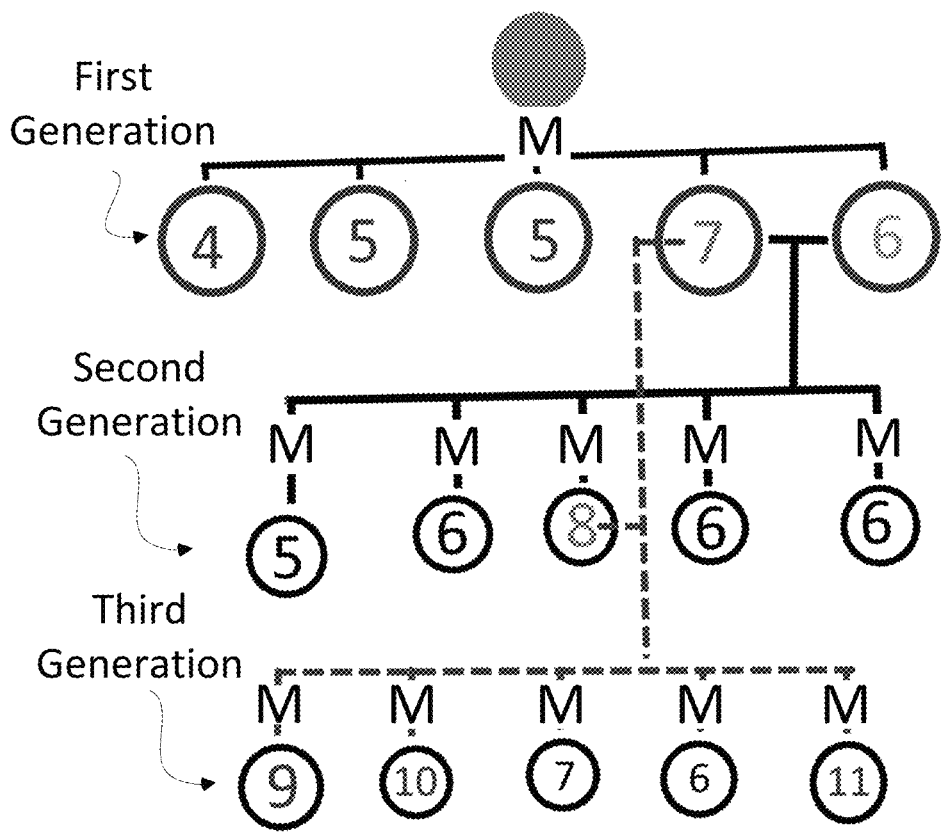
FIG. 16 is a depicting of multiple generations and intergenerational crossover.

Referring next to FIG. 16, shown is an exemplary representation of intergenerational crossover that may be implemented by the crossover component 516 in connection with the methods disclosed herein. In general, crossover is a method by which characteristics are passed on to new individual design copies, which are then themselves tested for fitness. The crossover component 516 may access the datastore 210 to obtain characteristics from intergenerational design copies (that are not within the same generation) to perform intergenerational crossover. Because many embodiments provide tree-based encapsulation of design characteristics across several generations (providing a characteristic record of each of the design copies) that is maintained in the datastore 210, characteristics of any size can be combined or mutated. Once a subtree is determined to be reproduced, a recursive function may be called on all subsequent children designs to implement the respective reproductive function. Three primary models may be used for reproduction: asexual, sexual, and polysexual (and some embodiments enable the user to choose type of reproduction).

Asexual reproduction may be achieved by copying the all-time best member of a species and mutating it until the user inputted number of children per generation are created. Asexual reproduction is the most efficient reproduction method, as it requires no characteristic combination between parents. In addition, asexual reproduction may be performed in connection with reproducing imperfect copies of the initial parent design.

Referring to FIG. 16 for example, the dark node may represent an initial parent design that is asexually reproduced (e.g., by the mutation algorithm depicted in FIG. 7) to generate the depicted first generation of design copies. In the example depicted in FIG. 16, fitness scoring on each of the design copies results in design copies with fitness scores of 4, 5, 5, 7, and 6.

Sexual reproduction may be achieved by randomly selecting characteristics from two parents and combining them until a sufficient number of offspring have been created. In FIG. 16, the design copies with the highest score (i.e., the design copies with fitness scores of 6 and 7) are sexually reproduced by the crossover module 516 to produce offspring, and each of the offspring undergo mutation (depicted by the letter M) to produce the second generation of offspring, which includes fitness scores of 5, 6, 8, 6, and 6. Thus, mutations occur within reproduction of design copies.

The crossover module 516 may then perform intergenerational crossover to produce a third generation of design copies. As shown in FIG. 16, the design copy in the first generation with a fitness score of 7 is sexually reproduced with the design copy in the second generation with a fitness score of 8. In other words, the two design copies in each different generation with the highest fitness score are sexually reproduced by intergenerational crossover. The resultant third generation includes offspring that include characteristics of the design copy with the fitness score of 7 and the fitness score of 8. As shown, each of the third generation design copies are the result of characteristics from the two design copies (with the fitness scores of 7 and 8) and then the resultant design copies are each mutated (represented by the letter M) to produce offspring in the third generation with fitness scores of 9, 10, 7, 6, and 11.

Figure 17:
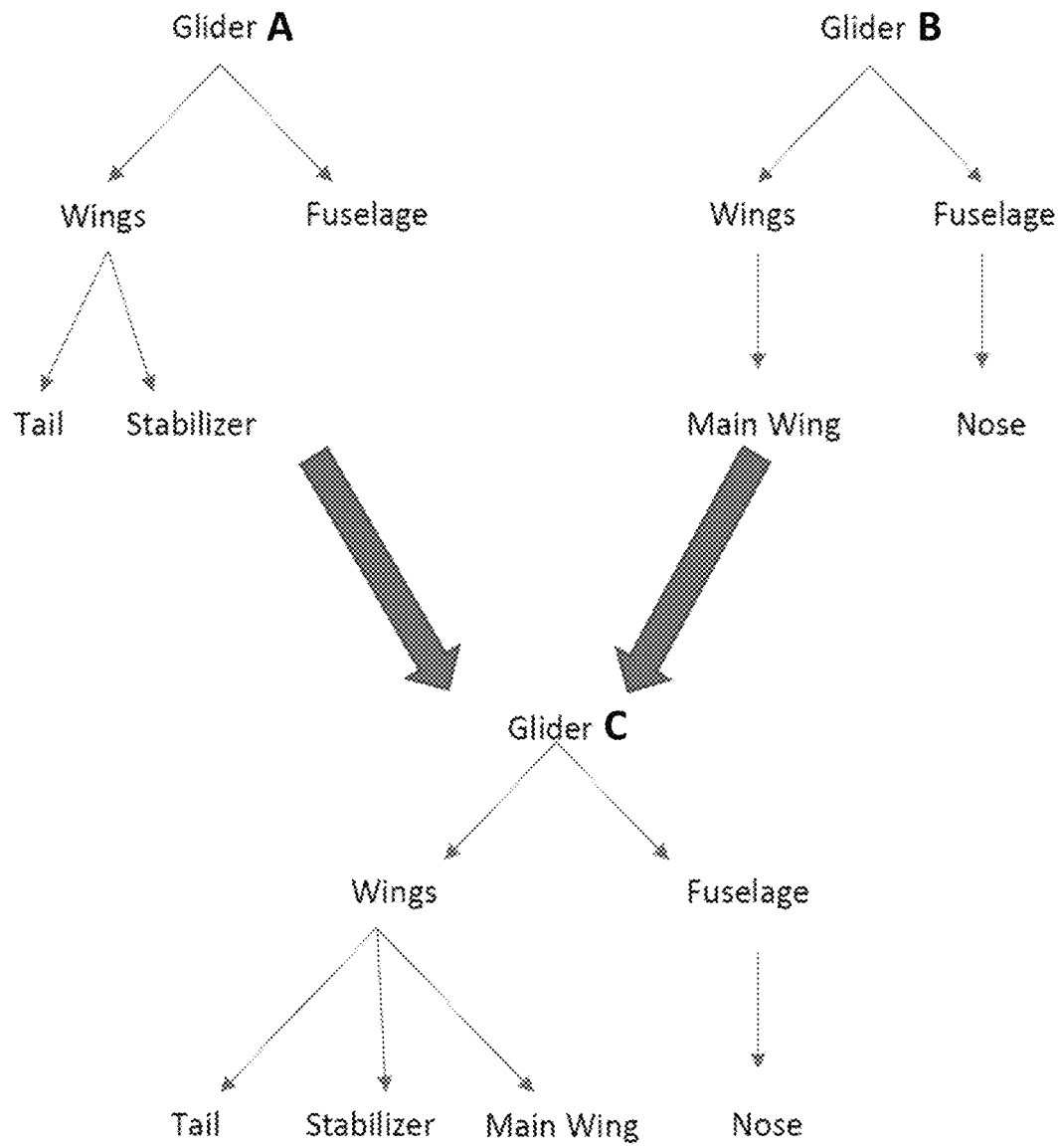
FIG. 17 illustrates a resultant design, or child, of sexual reproduction between two exemplary design copies.

Referring to FIG. 17, shown is an example of sexual reproduction between two parent glider designs: design A and design B. For example, the design copy A in FIG. 17 may represent details of the design copy with the fitness score of 7 in the first generation depicted in FIG. 16; design copy B may represent the design copy with the fitness score of 8 in the second generation depicted in FIG. 16; and design copy C may represent the design copy depicted in the third generation of FIG. 16 with the fitness score of 11. As shown in FIG. 17, the bottom left branch of glider design C, which includes tail, stabilizer, and main wing characteristics is inherited from parents A and B. And the bottom right branch of the glider C design, which includes a nose characteristic, is inherited from parent B. Hence the glider C design inherited properties from both parents. The offspring is then subject to mutation to allow for new characteristics within the design. Sexual reproduction can be achieved by random sexual reproduction and nonrandom sexual reproduction. In addition, the examples depicted in FIGS. 16 and 17 may be extended to polysexual reproduction where characteristics of more than two design copies (which may be intergenerational) may be combined.

Random sexual reproduction selects two individuals from a user input range of "bests" within the species. This increases the likelihood of overcoming local maxima by increasing the number of previously successful traits which can be combined to produce an offspring. However, random reproduction decreases efficiency due to the increased likelihood of harmful traits persisting in the species.

Nonrandom sexual reproduction always selects the two best individuals in a species and combines their characteristics to produce offspring, which are then mutated. This increases efficiency by decreasing the likelihood of harmful traits remaining in the species, but decreases likelihood of overcoming local maxima due to the smaller mutation range.

Figure 18:
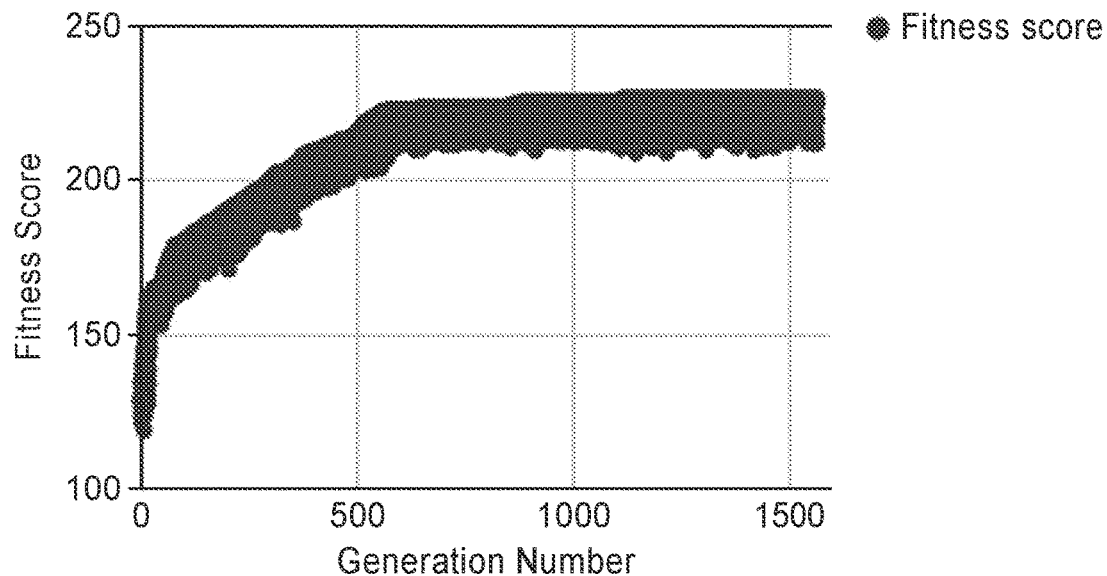
FIG. 18 is a graph of fitness score versus generation number results from a test run on glider evaluator software, using all the same presets as FIG. 9, save for the enabling of random sexual reproduction.
Figure 19:
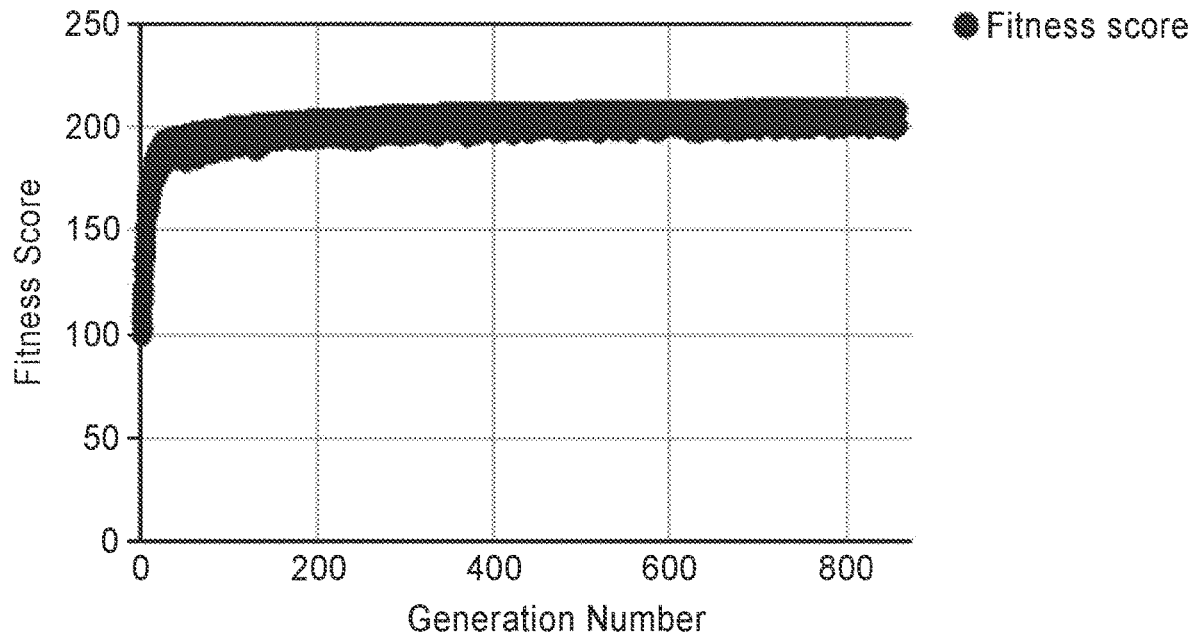
FIG. 19 is a graph of fitness score versus generation number results from a test run on glider evaluator software, using all the same presets as FIG. 9, save for the enabling of random sexual reproduction.
Figure 20:
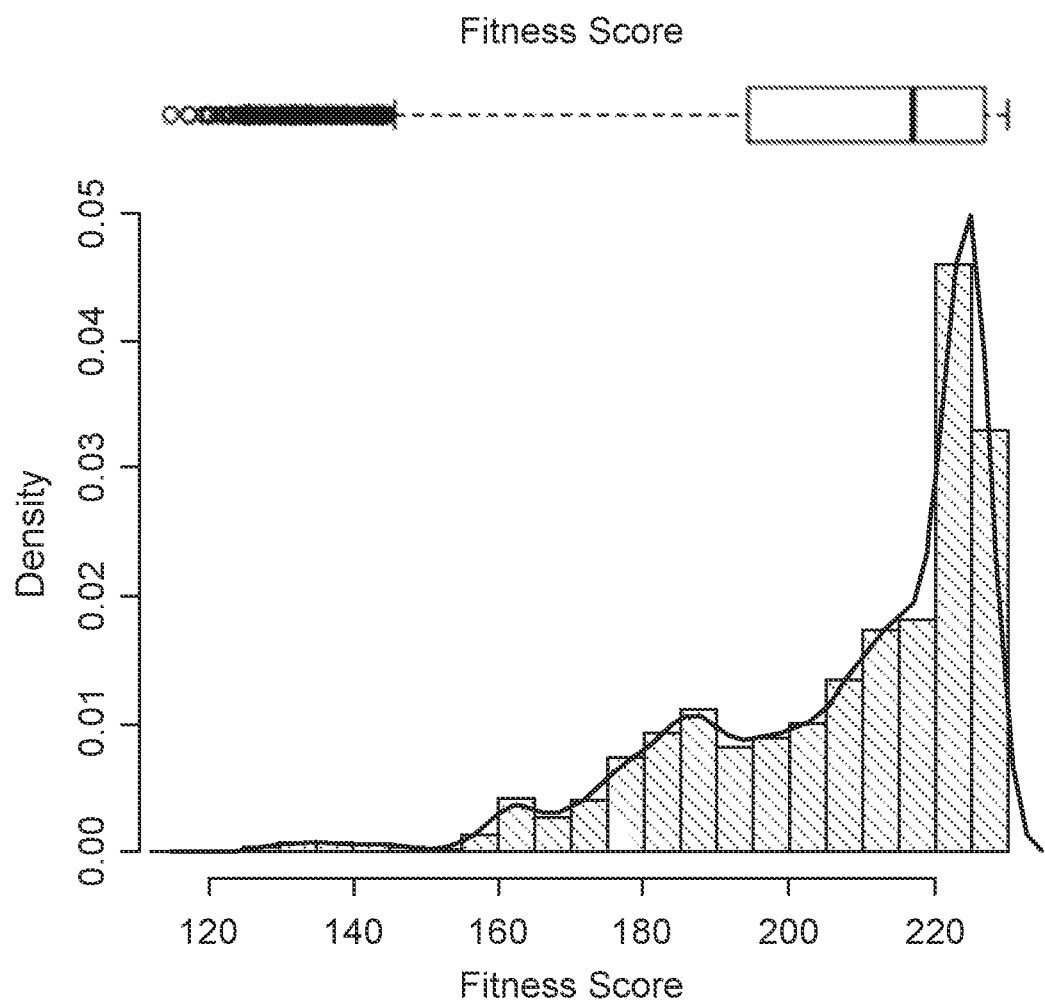
FIG. 20 is a fitness distribution density graph based on the test scenario in FIG. 18.

FIGS. 18, 19, and 20 illustrate how both random and nonrandom sexual reproduction are able to overcome local maxima due to the irregularities shown in the graphs. Comparing the results as represented in the graphs, it can be seen that the data in FIG. 18 is more irregular than represented in FIG. 19, indicating the scenario in FIG. 18 has overcome more local maxima compared to the scenario represented in FIG. 19. This means that random sexual reproduction is better at overcoming local maxima compared to nonrandom sexual reproduction. This particular example represented in FIG. 18 selected two parents for each child from a pool of the species' best five individuals. The significant irregularity shows that local maxima were overcome, hence making random sexual reproduction a valid method of overcoming local maxima. Compared to FIGS. 9, 17, and 19, FIG. 18 shows the most local maxima overcome and consequently offers the highest fitness score. Whereas the example represented in FIG. 19 selected the two most fit individuals in the species thus far to parent new individuals. The regularity shows that few, if any, local maxima were overcome, making nonrandom sexual reproduction ineffective relative to the technique in FIG. 18. It should be noted, however, that the final maximum was reached in almost half the generations as taken in FIG. 19. This demonstrates the prediction that nonrandom sexual reproduction would be more efficient than its random alternative. In FIG. 20, the multiple peaks indicate that several local maxima were overcome. The final fitness score of 227 demonstrates that a higher maxima was reached by random sexual reproduction scenario represented in FIG. 18, than the nonrandom model represented in FIG. 19.

Polysexual reproduction may be achieved by randomly selection characteristics from a user-input-parentage comprised of more than two parents and combining them until a sufficient number of offspring have been created. All offspring are then mutated for allow for new characteristics within the design. This can be achieved in two ways: random sexual reproduction and nonrandom polysexual reproduction.

Random sexual reproduction selects the parentage from a user input range of "bests" within the species. This increases the likelihood of overcoming local maxima by increasing the number of previously successful traits which can be combined to produce an offspring. However, random reproduction decreases efficiency due to the increased likelihood of harmful traits persisting in the species.

Nonrandom polysexual reproduction always selects the best parentage in a design and combines their traits to produce offspring, which are then mutated. This increases efficiency by decreasing the likelihood of harmful traits remaining in the species, but decreases the likelihood of overcoming local maxima due to the smaller mutation range.

Referring back to FIG. 5, the finality determinant module 520 generally operates to implement an auto-stop function to automatically stop the design evolution process in response to a trigger event. The trigger event may be set by a user (or may be set by default) as a generation-finality-determinant, which may be the number of children which are produced from a single parentage in each generation. This can be decided either through a simple user input value, or from two user input statistical values.

In the case of a simple number, that many (of the selected number) children in a generation and then produces the same number from the next selected parentage, and so on. In the case of the statistical value, a user approximation of the likelihood that any given parent is not the best in its species (likely to be >90%) and a statistical value known as the alpha value, which is the desired chance that a better offspring still remains after testing (likely <10%) are utilized. The values are then placed into the equation: $\log_c(\alpha) = i$, where C is the approximated chance of a better child existing, a the desired certainty, and i the number of individuals without improvement which are determined to be needed to trigger the next generation. Using this statistical-value approach, the algorithm implemented by the finality determinant module only proceeds to the next generation once a parentage shown to be sufficiently unlikely to produce any better offspring than they have already created, or than the species has already created. Thus, the finality determinant module 520 may continue to successively produce new generations of design copies until a likelihood that any design copy with a higher fitness score will be produced is below a statistical threshold.

This method heavily decreases efficiency because every parent produces offspring until it is unlikely that is will produce any which are better than those which have already been created. In many cases this would mean more than 70 offspring from a single parentage. However, this method drastically increases certainty that an absolute maxima has been reached by insuring that at no step along the species' path was a higher scoring offspring likely.

As shown in FIG. 5, the design evolution component 508 may include a regeneration module 520. In general, the regeneration module 520 functions to overcome local maxima by periodically starting a new design from a random starting point and evolving it until it has reached a maxima. The new design may be ended and started new according to an equation which offers the user a preselected degree of statistical certainty that a true maxima has been reached.

The equation used may be identical to that used in the generation finality determinate, but for a different end. A user approximation of the likelihood that any given parent is not the best in its species (likely to be >95%) may be input and a statistical value known as the alpha value may also be input, which is the desired chance that a better offspring still remains after testing (likely to be <5%). It then plugs the values into the equation: $\log_c(\alpha) = i$, where C is the approximated chance of a better child existing, a the desired certainty, and i the number of individuals without improvement which are determined to be needed to trigger the conclusion of a species.

Once a design evolution ended, a new starting point may automatically be generated and the evolution of the design may proceed until that same certainty of absolute maxima has been achieved, until a user input computational time duration has passed.

This allows the user to be semi-certain that a design has reached its absolute maximum fitness and restart without having to manually stop and restart the process, or input an arbitrary number of generations to attempt before stopping.

User Interface Input Automation

Another aspect disclosed herein is a streamlined mechanism for anyone intending to use the methods disclosed herein in their simulator (also referred to herein as simulation or evaluation software). Simulation and evaluation software, such as the simulator 209, allow testing of a fitness of design copies that are generated. Embodiments, allow for integration with graphical user interface "GUI-based" simulators as well as non-GUI simulators, covering the entire spectrum of simulators, thus allowing embodiments herein to reach multiple domains. Exemplary simulators that may be used to realize the simulator 209 include simulators provided in connection with the tradenames of MATLAB, JULIA, GNU OCTIVE, SCILAB, and SAGEMATH.

To begin, the user 200 may upload their simulator onto the server 202 and the simulator is unpacked and readied by the simulator discover component 204 for interaction with the design generation component 206 and the design evolution component 208. The simulator that the user 200 uploads can be a compiled file such that the entity (business or person) of the server 202 do not have access to its source code. The proceeding steps depend on whether the simulator is interfaceable through a GUI (GUI-based) or through text commands and arguments (non-GUI).

Users who upload non-GUI simulators will also need to upload a procedural file. This procedural file will contain the executable command needed to run the simulator. It may also contain the following information about different characteristics (also referred to as attributes) that may be mutated and that are accepted by the simulator: associated data files that the attributes are hosted in; attribute IDs; attribute names; and attribute configurations.

Associated Data Files that the Attributes are Hosted in.

Most simulators require an input of one or more data files that typically include a specimen that the simulator then uses to evaluate its fitness. These data files will contain different attributes that may be mutated; thus, this information links the attribute to the corresponding data file.

Attribute IDs.

The ID is what will match the attribute to the corresponding variable in the mimicked data file that will follow later in the procedural file. This will be described in more detail in the section below on the mimicked data file.

Attribute Names.

This will primarily be used to ease the process for the user. In many embodiments the server 202 provides a web user interface that will contain the results of the method described with reference to FIG. 3 as well as additional configurations for the various attributes. The attribute name will be displayed on the user interface since it much more human-readable than an attribute ID. The web interface will be described in more detail.

Attribute Configurations.

These configurations will set bounds on the extent to which algorithms described herein will mutate that characteristic (also referred to as an attribute). The bounds may be limits on byte sizes, character counts, or numeric ceilings and floors.

Figure 21:
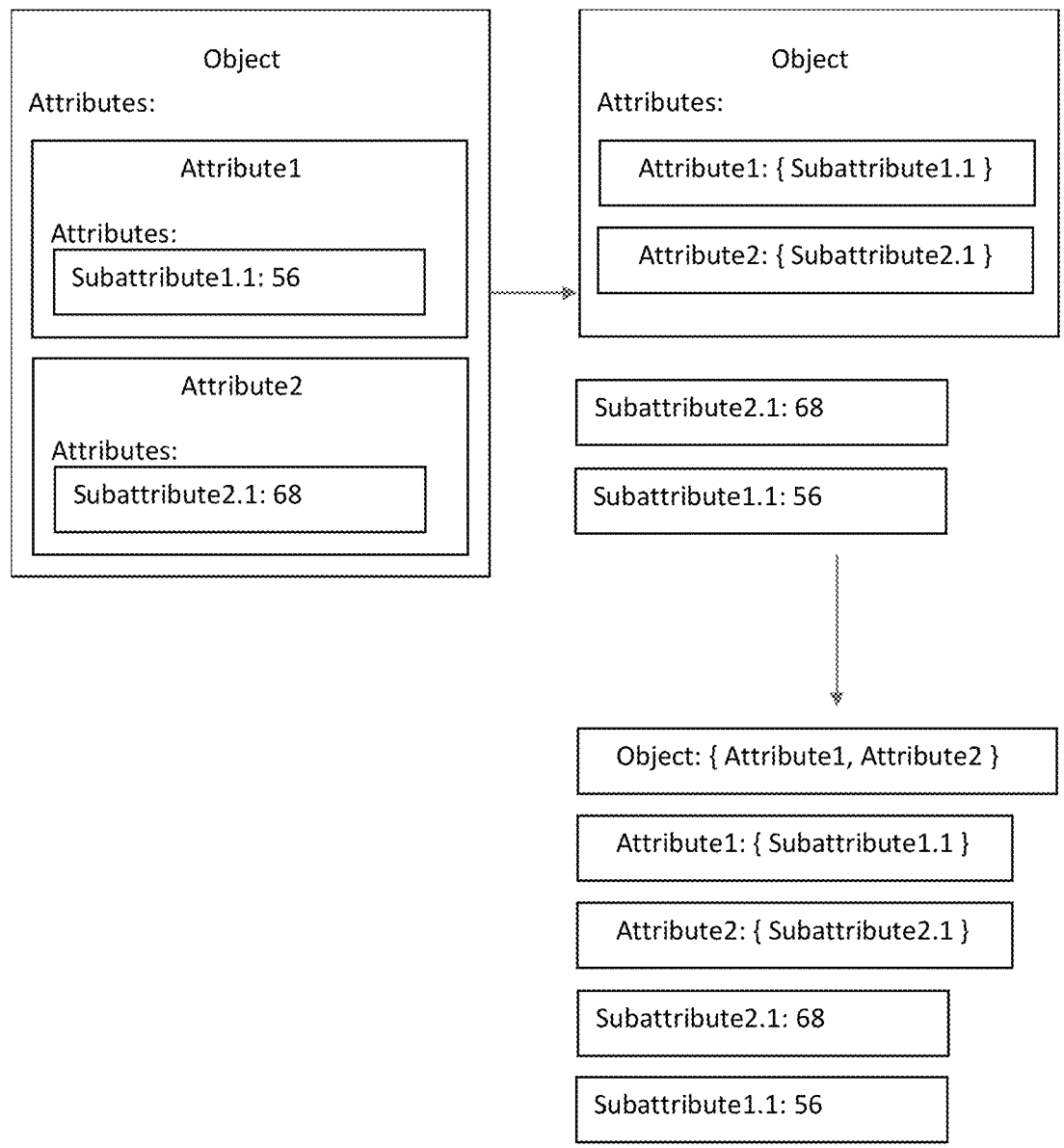
FIG. 21 illustrates a mechanism for which users translate their data files into readable data files according to the present invention.

If the simulator requires data files, the user 200 will also include, in the procedural file, a series of variable and value pairs that mimic the structure of the data file. Values can include additional variables (but must be noted as such) in order to chain variables together and create a hierarchical structure. This can be demonstrated in FIG. 21, which illustrates the mechanism for translating data files into a format that may be utilized by the algorithms disclosed herein. An example data file that a user's simulator software would accept is on the left, and the right is the modularized translation that allows a design to be properly constructed therefrom.

More specifically, the left side of the figure is the original representation of the data. The right side is the mimicked version with variables. In the definition of the variable attr1, it includes an additional variable within it: subattribute1.1 and subattribute2.1, which include the actual values of the data, but because of the way it is encapsulated within multiple variables (first within Attribute1 and Attribute2, then within the object), embodiments disclosed herein will not only be able to mutate the value of variable subattribute1.1, but also mutate variable subattribute1.1 in conjunction with variable subattribute2.1 when mutating the variable object. This allows for specific features of embodiments disclosed herein to effectively be used, such as genetic linkage. This additional variable encapsulation allows for inferences into what the nonlinear genetic representation of the organism will look like. The user will be able to adjust all of these values as well as the structure of the tree-based genetic representation accordingly on the web interface, and that will be described in more detail after the section on GUI-based simulators.

Users who upload GUI-based simulators may still upload a procedural file with the aforementioned information to specifically fine tune which attributes that they want to be mutated. The procedural file will still be used particularly if the GUI-based simulator takes data files, since then the mimicked data file will be used to guide the design evolution component 208. In some embodiments, the simulator discovery component is configured to infer attributes from GUI-based simulations; thus, saving users time and effort. The simulator discovery component 204 may include a discovery module; an optimization module; and a reusability module.

Discovery:

The discovery module of the simulator discovery module 204 may include an automated mouse script to detect different locations of interactivity on the user interface. It may use hover effects as well as click effects to determine what parts of the GUI can be considered as attributes, as well as what appropriate labels are associated with the attributes. For input boxes, it may use keyboard presses to detect if a specific space can accept user input, and note that down as a candidate for an attribute.

The mouse script may survey the GUI in an organized matter, starting in the top left of the screen. The script may move the mouse to the right by an atomic width number of pixels. This atomic width number refers to a base number of pixels that all interactivity are separated by—at a minimum—in physical distance on screen horizontally. At every step, the mouse may attempt a hover effect, a click effect, and a keyboard effect in that order.

(a) If the script detects additional text through a hover effect, it will store the text within the attribute label.
(b) If the click effect causes a large change in the screen, which is defined to be several magnitudes of atomic width wide, then the script will store this new screen as a checkpoint. Checkpoints are described in more detail later.

(c) If the click effect does not cause a large change in the screen, then the keyboard effect is initiated. Even if the click effect leads to the exact same screen as before in pixel to pixel comparison, the keyboard effect is still attempted. If the combined click and keyboard effect do not change the screen at all, then the step is completed and the mouse is moved according to the rules specified above. If the click effect led to a small change (defined to be within the scale of an atomic width number of pixels) and the keyboard effect did not further change the screen (such as in a checkbox or a radio button), then the click interactivity is noted as an attribute, and proceeds to step (d). However, if a keyboard effect leads to a small change, then an input field has been reached, stored as an attribute, and the script proceeds to step (d).

(d) If from step (c), an attribute was detected, the script then proceeds to locate a label for the attribute. It will search within a circle with a radius of an atomic width for text. Any text that falls within the circle will be associated with the attribute. Otherwise, no label could be found and will be resolved by the user through the web interface (specified later) or through the procedural file. The step is now completed, and the mouse moved to a different location.

After traversing an entire row of pixels, the script will reset the mouse on the leftmost side of the screen, but move it down by an atomic height number of pixels. The atomic height is similar to atomic width but measured in terms of vertical distance rather than horizontal distance. The atomic distances (referring to the atomic height and atomic width) can be specified in the procedural file or inferred by the script. The inferential technique runs through the width and the height of the program, for example, 50 times each (100 times collectively), spread out such that the 50 times spans the entire width (or height) equally. Each run would just be a boolean check for actionable interactivity (click effect and keyboard effect) in order to improve computational efficiency and runtime. If the dimensions for the 50 runs is smaller than any two interactive points, then the dimensions of each run is combined until a change in interactivity occurs, and thus becomes the atomic distance. Otherwise if the dimensions for the 50 runs is too large to cover the distance between the two interactive points, then another round is done with 100 runs. This will continue to be done, doubling the number of runs per round, until a small enough interval is found for the atomic distance. When enough simulations have been done and stored in the datastore 210, the 50 run count may be adjusted accordingly to a more optimal number. It is important to note that 50 is simply a starting point according to the present example, and even that starting point may fluctuate based on screen size, pixel density, or the internal layout of the GUI itself.

The mouse script will also store the entire history of previous actions, which would allow it to remember how to access and edit any attribute that it discovered. This also means if the mouse script executes a destructive action, such as closing a window, it can retrace the previous steps to revert to the proper place to continue discovery. Also, by storing specific checkpoints, such as when a new dialog window is opened or a new tab is unveiled, the script can piece together different checkpoints from memory to find the most optimal path to move the mouse from one point to another point within the program.

Figure 22:
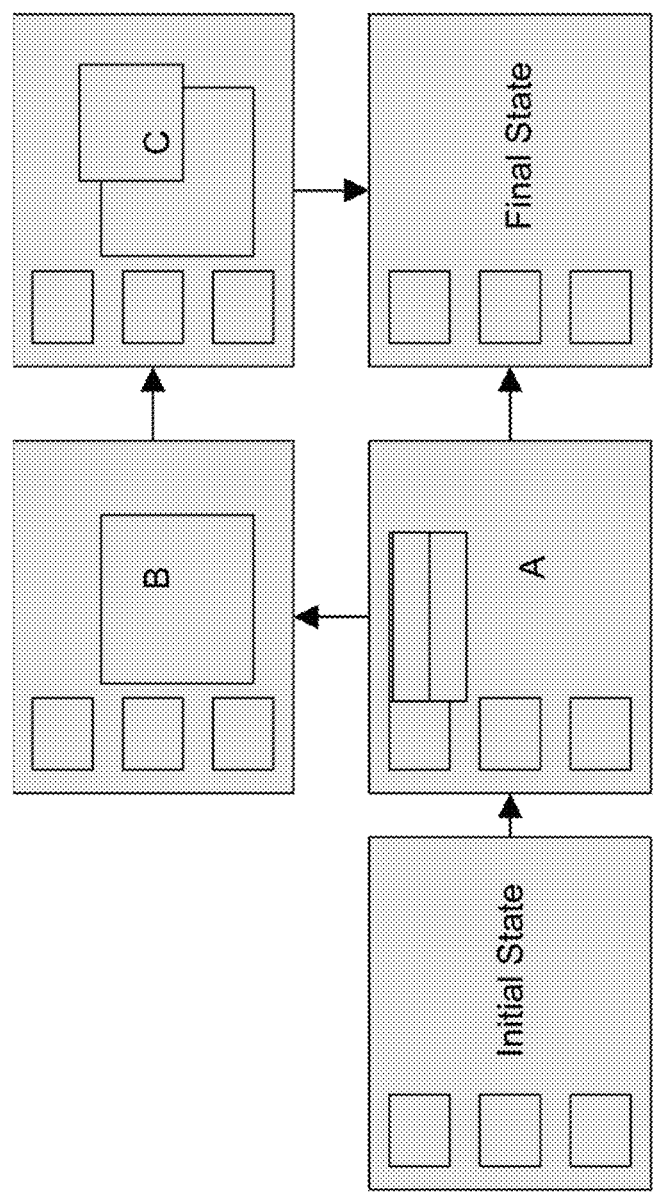
FIG. 22 illustrates a graphical user interface (GUI) based simulator software that shows different paths to move from an initial state to the intended final state.

Referring next to FIG. 22, shown is a graphical user interface (GUI) based simulator software that shows different paths to move from an initial state to the intended final state. When the mouse script is tasked with the goal of moving from the depicted Initial State to the depicted Final State, with discovery, the mouse script discovers that there is a path from A to Final State, and another path from A to B to C to the Final State. Using pixel to pixel image correspondence, the script detects that the Final State in both paths are the same, and thus stores the two paths in the datastore 210 connecting to the same Initial State and Final State checkpoints. A, B, and C are also checkpoints. Using the checkpoint system, it is able to eliminate the A-B-C-Final path because the algorithm is able to traverse from Initial State to Final State using a shorter number of checkpoints through A. Furthermore, the algorithm is able to optimize the time it takes to reach Final State. In a scenario where going directly from A to Final State requires running a ten second long process while traversing from A to B to C is instantaneous, and from C to Final State runs a three second long process, the script will add weights to the connections between checkpoints that reflect the amount of time it takes to travel the length of the connection. Then the script can use Dijkstra's algorithm, an algorithm for finding the shortest path between two nodes in a weighted graph, to find that the most optimal weighted path from Initial State to Final State goes through checkpoints B and C.

Optimization:

The discovery process is still largely an estimation of where the attributes are located, and may require human input at some point in the process to fine tune the results. The optimization steps may include two techniques: heat map tracking and a chatbot.

(e) In connection with heat map tracking, humans may be asked to use the simulator normally, which will involve accessing and changing attributes. All of the collective mouse clicks from said uses may be tracked and stored on a heat map. Heat maps prevent misclicks from adding influential noise to the results. The heat map will show the most clicked areas on the GUI, and the frequency of clicks can reveal what step in the process that click would be in. In FIG. 22, the upper portion of the screen corresponding to A will have the most amount of clicks, since all paths from Initial State to Final State require interacting with A. The portions of the screen corresponding to B and C will be much cooler than the screen corresponding to A, but should be the same frequency as each other. This indicates that users that traverse to screen B will always progress to screen C, indicating a linearly in that path. The heat map will be used to verify and add additional attributes to the associated simulator.

(f) A chatbot, or an equivalent communications interface may be used to learn directly from a human navigating the simulator. Whenever the person interacts with the screen, the bot notes down what the user did to trigger the interactivity and the mouse movements, and inquires what the human did. If the human responds with an attribute, the bot then asks for the attribute's name. This method requires much fewer man-hours than the heat map, but requires each person to invest more time in communicating and training the chatbot. However, this method can be much more accurate than the heatmap since the bot takes feedback directly from the human rather than through inference.

Reusability:

The results from discovery and optimization are all stored in the database in a way that is associated with the simulator. The results include attributes, their labels, the mouse trajectories and necessary interactions to access the attribute, and any other configurations that previous users may have specified in the optimization step, in their procedural files, or on the web interface. Thus, if a user uploads a simulator that matches a simulator already on file, then all of the attributes can be located accurately and instantaneously from previous efforts. Furthermore, work on a specific simulator may be parallelized among multiple parties because the results are all stored in a single database.

The discovery and reusability modules of the simulator discovery component 204 may be instantly triggered when a user uploads a GUI simulator onto the server 202. However, the optimization module may require more time to initiate because it may be implemented by enlisting crowdsourcing. Thus results (the attributes that have been located) from discovery and reusability will be nearly instantaneously available to the client upon upload of the simulator, while results from the optimization layer may come later. Once all of the attributes have been located, server 202 will provide a web user interface for the user to access and adjust the attributes if necessary. The web interface will also provide an additional option to store the attributes in a tree-based representation. This assists the design evolution component 208 for the non-linear characteristic representation of design copies. If the user does not specify a tree representation, then the design evolution component 208 may infer the representation based on the variable encapsulation model that is exemplified in FIG. 21.

Once the user 200 is satisfied with the attributes and the way that they are implemented, an execution script may be triggered on the web interface that is sent to the server 202. This will determine which type of server will best run the simulation by examining the operating system, the technical specifications of the server, and whether the simulation requires a GUI or not. While running the simulation software, if a better server becomes available or if it is discovered that the current server is not adequate for the needs of the process, then the entire process will be frozen and transferred to another server that is estimated to be more effective. When the results are ready for viewing, the results may be placed on the server 202 for presentation in the user interface with downloadable data files (if applicable to the simulator 209).

Figure 24:
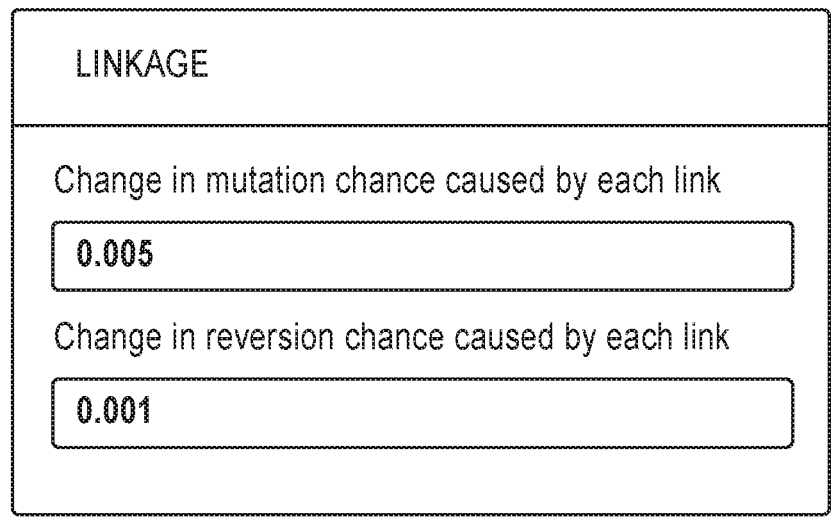
FIG. 24 depicts a screenshot of an exemplary user interface with exemplary user-definable parameter-value-fields associated with linkage.

Referring next to FIGS. 23 to 28 shown are exemplary user interfaces that may be provided to the user 200 by the server 202 (e.g., via one or more webpages). More specifically, FIG. 23 depicts exemplary user-definable parameter-value-fields associated with annealing that may be utilized by the annealing component 512. FIG. 24 depicts exemplary user-definable parameter-value-fields associated with linkage that may be utilized by the permeance component 515. FIG. 25 depicts exemplary user-definable parameter-value-fields associated with memorization that are utilized by the by the permanence component 515. FIG. 26 depicts exemplary user-definable parameter-value-fields associated with defining parentage that may be utilized by the design generation component 206. FIG. 27 depicts exemplary user-definable parameter-value-fields associated with permanence (also referred to herein as reversion) that may be utilized by the permanence component 515. FIG. 28 depicts exemplary user-definable parameter-value-fields utilized by the design evolution component 208 and the finality determinant component 518 to enable the auto-stop aspects described herein.

The figures and the illustrations, embodiments, examples and descriptions included in this written description are exemplary and are not intended to limit or interpret the scope or meaning of the invention. While the system and method have been described in terms of one or more of these embodiments, it is understood that alternatives to those described can be envisioned and thus incorporated by one skilled in the art, and thus are intended to be included herein. In some embodiments of the invention, the steps may occur in sequences different than noted in the figures. For example, two steps shown in succession may in fact be executed substantially concurrently or may sometimes be executed in the reverse order, depending upon the functionality involved.

Figure 29:
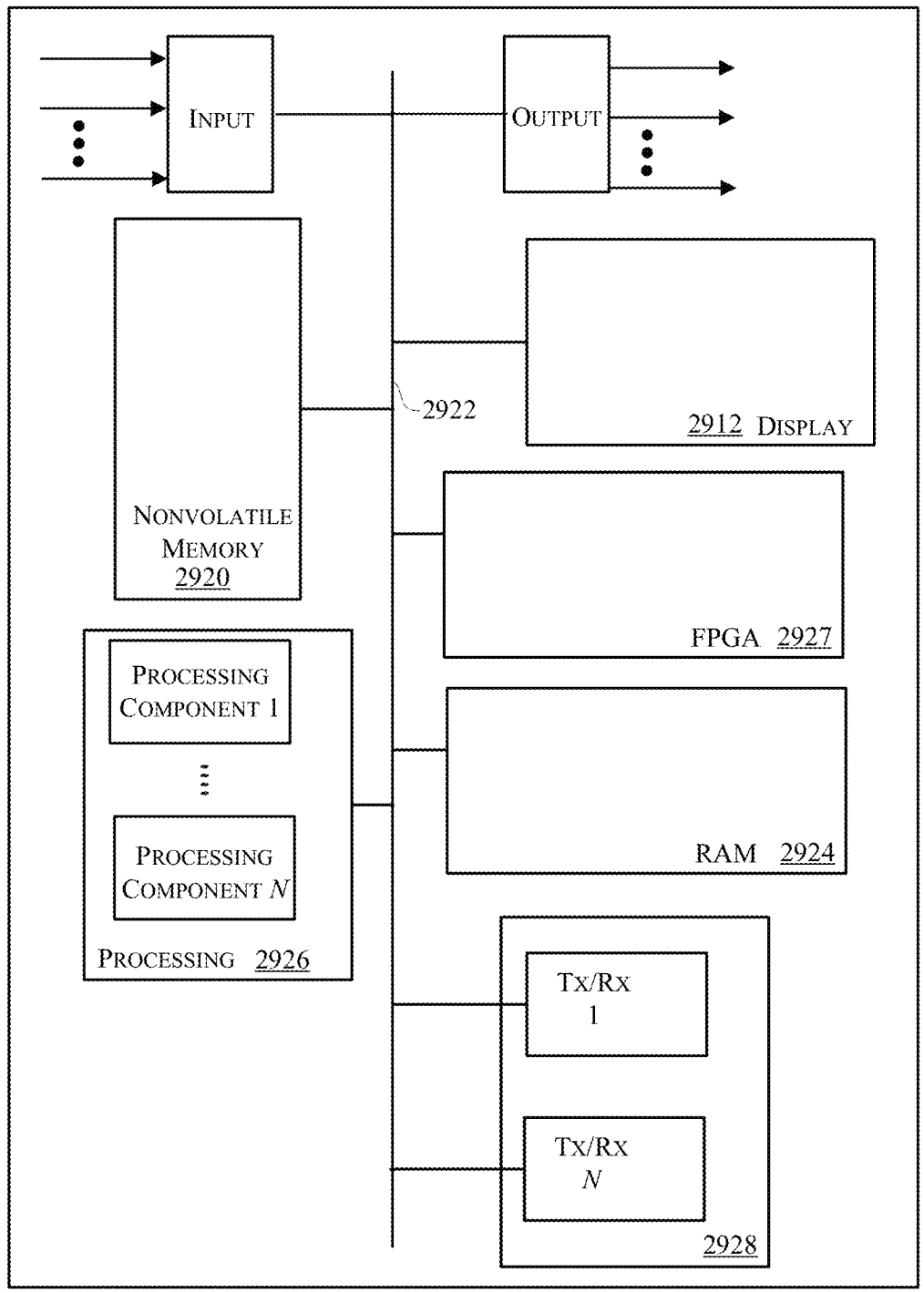
FIG. 29 is a block diagram of an exemplary computing device.

Referring next to FIG. 29, shown is a block diagram depicting a general-purpose computing device that may be utilized to realize the one or more aspects of the embodiments disclosed herein. For example, aspects of the server 202, simulator discovery component 204, design generation component 206, and design evolution component 208 may be realized by the computing device. In addition, the depicted computing device may be used by the user 200 to run client-side software and to communicate with the server 202 (via the network).

As shown, in this embodiment a display portion 2912 and nonvolatile memory 2920 are coupled to a bus 2922 that is also coupled to random access memory ("RAM") 2924, a processing portion (which includes N processing components) 2926, a field programmable gate array (FPGA) 2927, and a transceiver component 2928 that includes N transceivers.

Although the components depicted in FIG. 29 represent physical components, FIG. 29 is not intended to be a low-level, detailed hardware diagram; thus, many of the components depicted in FIG. 29 may be realized by common constructs or distributed among additional physical components. Some components of FIG. 29 may be omitted in some implementations. Moreover, it is contemplated that other existing and yet-to-be developed physical components and architectures may be utilized to implement the functional components described with reference to FIG. 29.

This display portion 2912 generally operates to provide a user interface for an operator of the server 202, simulator discovery component 204, design generation component 206, and design evolution component 208. The display may be realized, for example, by a liquid crystal display or AMOLED display, and in several implementations, the display is realized by a touchscreen display to enable an operator of the server 202, simulator discovery component 204, design generation component 206, and design evolution component 208 to modify configurable aspects and to service and update aspects of the server 202, simulator discovery component 204, design generation component 206, and design evolution component 208. In general, the nonvolatile memory 2920 is non-transitory memory that functions to store (e.g., persistently store) data and processor executable code (including executable code that is associated with effectuating the methods described herein). In some embodiments for example, the nonvolatile memory 2920 includes bootloader code, operating system code, file system code, and non-transitory processor-executable code to facilitate the execution of the functionality of the server 202, simulator discovery component 204, design generation component 206, and design evolution component 208.

In many implementations, the nonvolatile memory 2920 is realized by flash memory (e.g., NAND or ONENAND memory), but it is contemplated that other memory types may also be utilized. Although it may be possible to execute the code from the nonvolatile memory 2920, the executable code in the nonvolatile memory is typically loaded into RAM 2924 and executed by one or more of the N processing components in the processing portion 2926. The depicted nonvolatile memory 2920 may be used to realize the datastore 210 described with reference to FIG. 2.

The N processing components in connection with RAM 2924 generally operate to execute the instructions stored in nonvolatile memory 2920 to facilitate execution of the methods disclosed herein. For example, non-transitory processor-executable instructions to effectuate aspects of the algorithms and methods described herein may be persistently stored in nonvolatile memory 2920 and executed by the N processing components in connection with RAM 2924. For example, the functional components depicted in FIGS. 2 and 5 may be realized by the algorithms described herein that are implemented by software (i.e., processor-executable code) that is executed from RAM 2924. In addition to the several flowcharts disclosed herein, algorithms are described textually, but nonetheless, these textually-described algorithms are implemented by software and/or hardware. As one of ordinarily skill in the art will appreciate, the processing portion 2926 may include a video processor, digital signal processor (DSP), graphics processing unit (GPU), and other processing components.

In addition, or in the alternative, the FPGA 2927 may be configured to effectuate one or more aspects of the methodologies described herein. For example, non-transitory FPGA-configuration-instructions may be persistently stored in nonvolatile memory 2920 and accessed by the FPGA 2927 (e.g., during boot up) to configure the FPGA 2927 to effectuate one or more functions of the control and logic components described herein.

As one of ordinary skill in the art in view of this disclosure will appreciate, the depicted input and output modules may be used for several different purposes to interact with the computing device.

The depicted transceiver component 2928 includes N transceiver chains, which may be used for communicating with external devices via wireless or wireline networks. Each of the N transceiver chains may represent a transceiver associated with a particular communication scheme (e.g., SCADA, DNP3, WiFi, Ethernet, Modbus, CDMA, Bluetooth, NFC, etc.).

The embodiments described herein may employ various computer-implemented operations involving processors and data stored in computer systems and databases therein. Any of the operations herein described that form part of the embodiments are useful machine operations that take placed within a computing system, from a device or apparatus for performing these operation. The apparatus can be specially constructed for the required purpose, or the apparatus can be a general purpose computer selectively activated or configured by a computer program stored in the computer. In particular, various general purpose machines can be used with processor power to execute computer programs and algorithms written in accordance with the teachings herein, or it may be more convenient to construct or more specialized apparatus to perform the required operations.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The description is intended to cover various modifications and similar arrangements within the spirit and scope of the invention; the scope should be accorded the broadest interpretation so as to encompass all such modifications and similar structures. Accordingly, the present embodiments are to be considered as illustrative and not restrictive, and the invention is not limited to the details given herein.

What is claimed is:

1. A method for producing an engineering design, the method comprising:
receiving at least one parent design and generating a plurality of first-generation design copies of the parent design, wherein each of the first-generation design copies includes a characteristic that has mutated from the parent design;
fitness testing each of the first-generation design copies to determine which first-generation design copies will be copied to generate additional design copies;
successively producing new generations of design copies from the additional design copies and fitness testing the new generations of design copies to determine which design copies are copied, wherein producing new generations of design copies includes:
storing a characteristic record that includes data defining each of the design copies across multiple generations in a datastore;
accessing the datastore to obtain characteristics from intergenerational design copies that are not within the same generation to perform intergenerational crossover;
increasing a likelihood of a mutation of a design copy in response to a threshold number of generations without an improvement in a fitness score of a design copy;
decreasing a likelihood of a characteristic changing during mutation if the characteristic persists for a characteristic-threshold number of generations;
tracking linked-characteristics which have appeared together in fit designs and increasing a likelihood of appearance of the linked-characteristics; and
continuing to successively produce new generations of design copies until a likelihood that any design copy with a higher fitness score will be produced is below a statistical threshold.

2. The method of claim 1, wherein the receiving includes receiving the parent design from a design generation component.

3. The method of claim 1, including generating the fitness scores with a user-provided simulation tool, and wherein the simulation tool provides the fitness scores.

4. The method of claim 1, including storing the characteristic record as characteristics that are grouped in a tree-based hierarchy.

5. The method of claim 1, including storing the characteristic record as characteristics that are grouped in an array of booleans.

6. The method of claim 1, wherein increasing a likelihood of a mutation of a design copy includes increasing a magnitude of the mutation in response to a threshold number of generations without an improvement in a fitness score.

7. The method of claim 1, including obtaining user inputs for the likelihood of a mutation of a design copy; the characteristic-threshold number of generations; a change in mutation likelihood based upon linked-characteristics; the likelihood that any parent is not best in its species; and the desired chance that a better offspring still remains after testing is met.

8. An engineering design tool system, comprising:
a design generation component configured to provide at least one parent design;
a characteristic alteration component configured to generate a plurality of first-generation design copies of the parent design by mutating one or more characteristics of the parent design;
a simulator configured to fitness test each of the first-generation design copies to enable a determination of which first-generation design copies will be copied to generate additional design copies;
a datastore configured to store a characteristic record of each of the design copies;
a design evolution component configured to:
successively produce new generations of design copies from the additional design copies and utilize the simulator to fitness test the new generations of design copies to determine which design copies are copied, wherein the design evolution component is configured to:
access the datastore to obtain characteristics from intergenerational design copies that are not within the same generation to perform intergenerational crossover;
increase a likelihood of a mutation of a design copy in response to a threshold number of generations without an improvement in a fitness score of a design copy;
decrease a likelihood of a characteristic changing during mutation if the characteristic persists for a characteristic-threshold number of generations;
tracking linked-characteristics which have appeared together in fit designs and increasing a likelihood of appearance of the linked-characteristics; and
automatically stop producing new generations of design copies when a likelihood that any design copy with a higher fitness score will be produced is below a statistical threshold.

9. The engineering design tool of claim 8, including a design generation component configured to randomly generate the at least one parent design.

10. The engineering design tool of claim 8, including a simulator discovery component configured to discover attributes of the simulator to enable communication between the simulator and the design evolution component.

11. The engineering design tool of claim 8, wherein the design evolution component is configured to increase a magnitude of the mutation in response to a threshold number of generations without an improvement in a fitness score.

12. The engineering design tool of claim 8, including a server to serve up webpages with a user interface to obtaining user inputs for the likelihood of a mutation of a design copy; the characteristic-threshold number of generations; a change in mutation likelihood based upon linked-characteristics; the likelihood that any parent is not best in its species; and the desired chance that a better offspring still remains after testing is met.

13. A non-transitory, tangible processor readable storage medium, encoded with processor executable code to perform a method for producing an engineering design, the method comprising:

receiving at least one parent design and generating a plurality of first-generation design copies of the parent design, wherein each of the first-generation design copies includes a characteristic that has mutated from the parent design;
fitness testing each of the first-generation design copies to determine which first-generation design copies will be copied to generate additional design copies;
successively producing new generations of design copies from the additional design copies and fitness testing the new generations of design copies to determine which design copies are copied, wherein producing new generations of design copies includes:
storing a characteristic record that includes data defining each of the design copies across multiple generations in a datastore;
accessing the datastore to obtain characteristics from intergenerational design copies that are not within the same generation to perform intergenerational crossover;
increasing a likelihood of a mutation of a design copy in response to a threshold number of generations without an improvement in a fitness score of a design copy;
decreasing a likelihood of a characteristic changing during mutation if the characteristic persists for a characteristic-threshold number of generations;
tracking linked-characteristics which have appeared together in fit designs and increasing a likelihood of appearance of the linked-characteristics; and
continuing to successively produce new generations of design copies until a likelihood that any design copy with a higher fitness score will be produced is below a statistical threshold.

14. The non-transitory, tangible processor readable storage medium of claim 13, wherein the receiving includes receiving the parent design from a design generation component.

15. The non-transitory, tangible processor readable storage medium of claim 13, including executable code to generate the fitness scores with a user-provided simulation tool, and wherein the simulation tool provides the fitness scores.

16. The non-transitory, tangible processor readable storage medium of claim 13, including executable code to store the characteristic record as characteristics that are grouped in a tree-based hierarchy.

17. The non-transitory, tangible processor readable storage medium of claim 13, including executable code to store the characteristic record as characteristics that are grouped in an array of booleans.

18. The non-transitory, tangible processor readable storage medium of claim 13, wherein increasing a likelihood of a mutation of a design copy includes increasing a magnitude of the mutation in response to a threshold number of generations without an improvement in a fitness score.

19. The non-transitory, tangible processor readable storage medium of claim 13, including executable code to obtain user inputs for the likelihood of a mutation of a design copy; the characteristic-threshold number of generations; a change in mutation likelihood based upon linked-characteristics; the likelihood that any parent is not best in its species; and the desired chance that a better offspring still remains after testing is met.

* * * * *